United States Patent
Lewis et al.

(10) Patent No.: US 9,053,424 B1
(45) Date of Patent: Jun. 9, 2015

(54) LEARNING MECHANISM FOR RECOMMENDED REORDERING OF ELEMENTS BASED ON DEMOGRAPHIC INFORMATION

(71) Applicant: Google Inc., Mountain View, CA (US)

(72) Inventors: Justin Lewis, Marina Del Ray, CA (US); Luke Ravitch, Hawthorne, CA (US)

(73) Assignee: Google Inc., Mountain View, CA (US)

( * ) Notice: Subject to any disclaimer, the term of this patent is extended or adjusted under 35 U.S.C. 154(b) by 259 days.

(21) Appl. No.: 13/662,275

(22) Filed: Oct. 26, 2012

(51) Int. Cl.
*G06N 5/02* (2006.01)
*G06N 5/04* (2006.01)
*G06F 17/30* (2006.01)

(52) U.S. Cl.
CPC ............ *G06N 5/04* (2013.01); *G06F 17/30699* (2013.01)

(58) Field of Classification Search
CPC . G06N 5/04; G06Q 30/0204; G06Q 30/0631; G06F 17/30699; G06F 17/30702; G06F 17/30861; H04N 21/252; H04N 21/4668
See application file for complete search history.

(56) References Cited

U.S. PATENT DOCUMENTS

| | | | | |
|---|---|---|---|---|
| 5,884,282 A * | 3/1999 | Robinson | | 705/7.33 |
| 6,321,179 B1 * | 11/2001 | Glance et al. | | 702/189 |
| 7,647,365 B2 * | 1/2010 | Horvitz et al. | | 707/813 |
| 7,743,067 B2 * | 6/2010 | Ducheneaut et al. | | 707/769 |
| 7,756,753 B1 * | 7/2010 | McFarland | | 705/26.1 |
| 7,853,485 B2 * | 12/2010 | Song et al. | | 705/26.1 |
| 8,108,245 B1 * | 1/2012 | Hosea et al. | | 705/7.33 |
| 8,306,975 B1 * | 11/2012 | Eldering | | 707/732 |
| 8,365,213 B1 * | 1/2013 | Orlowski | | 725/13 |
| 8,762,201 B1 * | 6/2014 | Noonan | | 705/14.41 |
| 8,775,415 B2 * | 7/2014 | Jeon et al. | | 707/721 |
| 2005/0160458 A1 * | 7/2005 | Baumgartner | | 725/46 |
| 2006/0274765 A1 * | 12/2006 | Savoor et al. | | 370/401 |
| 2007/0106656 A1 * | 5/2007 | Gutta | | 707/5 |
| 2008/0090513 A1 * | 4/2008 | Collins et al. | | 455/3.01 |
| 2008/0092182 A1 * | 4/2008 | Conant | | 725/109 |
| 2008/0147501 A1 * | 6/2008 | Gilliam | | 705/14 |
| 2008/0201731 A1 * | 8/2008 | Howcroft | | 725/13 |
| 2009/0083780 A1 * | 3/2009 | Beyabani | | 725/14 |
| 2009/0182622 A1 * | 7/2009 | Agarwal et al. | | 705/10 |
| 2009/0276284 A1 * | 11/2009 | Yost | | 705/10 |
| 2010/0180029 A1 * | 7/2010 | Fourman | | 709/225 |
| 2011/0087679 A1 * | 4/2011 | Rosato et al. | | 707/749 |
| 2011/0099488 A1 * | 4/2011 | Jin et al. | | 715/764 |
| 2011/0125783 A1 * | 5/2011 | Whale et al. | | 707/769 |
| 2011/0153550 A1 * | 6/2011 | Agarwal et al. | | 707/603 |
| 2011/0264644 A1 * | 10/2011 | Grant et al. | | 707/706 |
| 2011/0289317 A1 * | 11/2011 | Darapu et al. | | 713/168 |
| 2012/0158516 A1 * | 6/2012 | Wooten et al. | | 705/14.66 |
| 2012/0254910 A1 * | 10/2012 | Donoghue et al. | | 725/14 |
| 2013/0254025 A1 * | 9/2013 | Liu et al. | | 705/14.53 |
| 2014/0108153 A1 * | 4/2014 | Matus | | 705/14.66 |
| 2014/0115497 A1 * | 4/2014 | Dhaliwal et al. | | 715/753 |
| 2014/0156417 A1 * | 6/2014 | Biswas et al. | | 705/14.66 |
| 2014/0244660 A1 * | 8/2014 | Lewis et al. | | 707/748 |
| 2014/0245183 A1 * | 8/2014 | Lewis et al. | | 715/753 |

* cited by examiner

*Primary Examiner* — Lut Wong
*Assistant Examiner* — Paulinho E Smith
(74) *Attorney, Agent, or Firm* — Amin, Turocy & Watson, LLP

(57) ABSTRACT

This disclosure relates to relates to systems and methods that facilitate generating an ordered list of a set of elements based upon user demographics or granular reordering of an ordered list of elements over a subset size based upon demographic information to increase likelihood of selection of at least one element of the set of elements.

21 Claims, 17 Drawing Sheets

US 9,053,424 B1

LEARNING MECHANISM FOR RECOMMENDED REORDERING OF ELEMENTS BASED ON DEMOGRAPHIC INFORMATION

TECHNICAL FIELD

This disclosure generally relates to systems and methods that facilitate generating an ordered list of a set of elements based upon user demographics or granular reordering of an ordered list of elements over a subset size based upon demographic information to increase likelihood of selection of at least one element of the set of elements.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, a demographics component configured to obtain at least one demographic parameter associated with at least one user, a set identification component configured to identify a set of channels, and a set sorting component configured to employ a sorting algorithm to generate a list comprising a subset of the channels in an order defined to increase likelihood that at least one channel of the subset of channels will be selected for subscription.

In accordance with another non-limiting implementation, at least one demographic parameter associated with at least one user is received, a set of elements is received, and a list is generated comprising a subset of the channels in an order defined to increase likelihood that at least one channel of the subset of channels will be selected for subscription.

These and other implementations and embodiments are described in more detail below.

DETAILED DESCRIPTION

Overview

Figure 1:
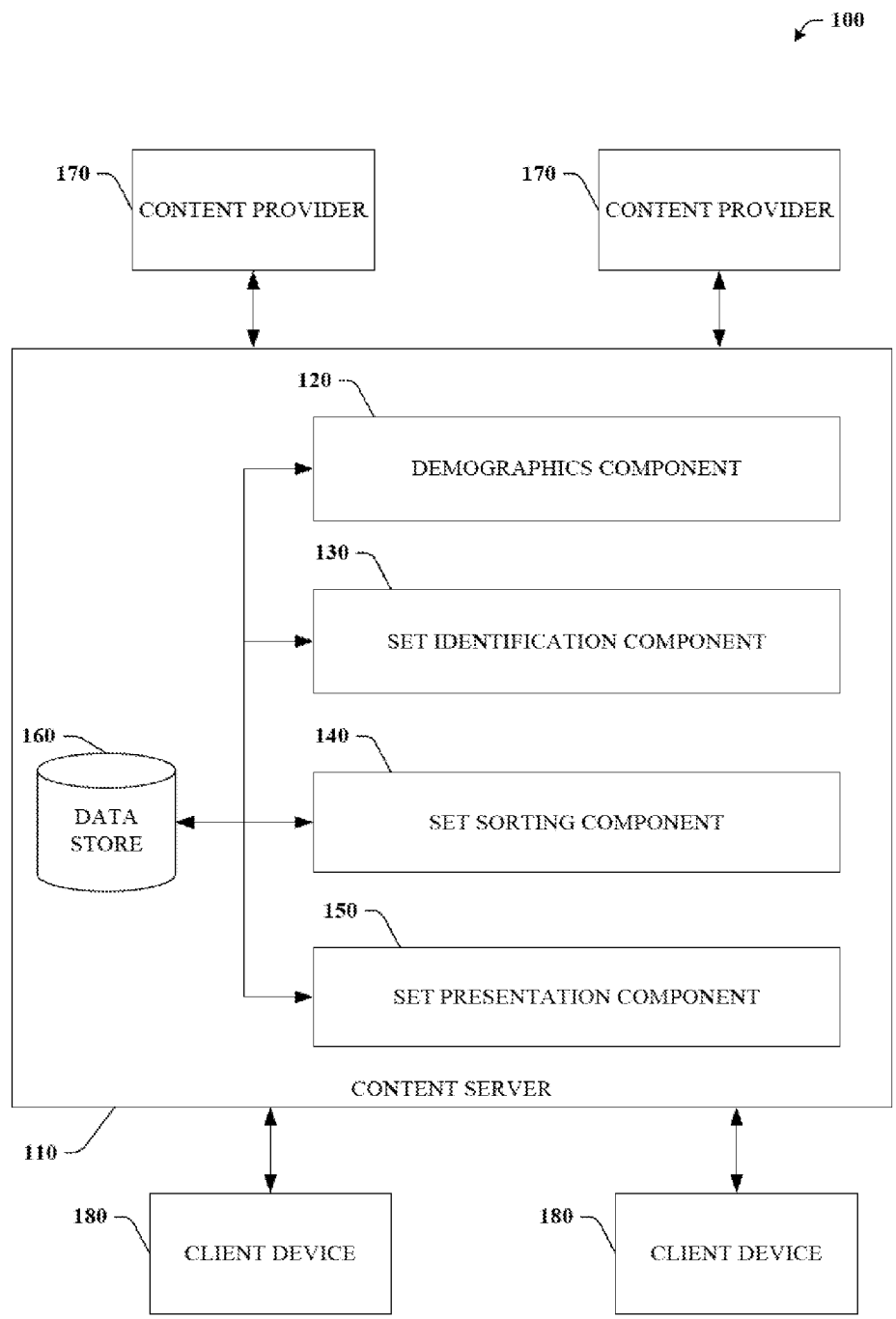
FIG. 1 illustrates a block diagram of an exemplary non-limiting system that generates sorted lists of channels of video content for presentation to a plurality of client devices based upon demographics in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In situations in which the systems and methods discussed here collect personal information about users, or may make use of personal information, the users can be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. The user can add, delete, or modify information about the user. Thus, the user can control how information is collected about the user and used by a content server.

In accordance with various disclosed aspects, a mechanism is provided for a content server to present a set of elements according to a sort order that increases likelihood of user selection of at least one element of the set of elements. In certain applications that have a set of elements, user selection of a particular element in the set is not as important as selection of the entire set or at least one element in the set. For example, a content site that has a variety of channels of content that generate advertising revenue is concerned with the number of subscribers of channels irrespective of which channel they subscribe. Accordingly, optimizing presentation of a list of channels to a user or group of users to increase overall subscriptions of channels can increase advertising revenue. It is to be appreciated that a set of elements, for example, can include content or channels of content.

Content (or content item) can include, for example, video, audio, image, text, or any combination thereof, non-limiting examples of which include, music, speeches, cartoons, short films, movies, televisions shows, documents, books, magazines, articles, novels, quotes, poems, comics, advertisements, photos, posters, prints, paintings, artwork, graphics, games, applications, tickets, coupons, any other creative work that can be captured and/or conveyed through video, audio, image, text, or any combination thereof, friends, or any other suitable element that can be presented to a user for selection. In a non-limiting example, a content site can include channels of video content for subscription. In another non-limiting example, a ticket site can contain event tickets available for sale. A further non-limiting example is a website that presents coupons. Another example can include presenting a list of possible friends that user can select for establishing a connection. An additional example is presenting content that a user can select to rate or like. It is to be appreciated that selection of an element can include any suitable action initiated by a user with respect to an element. Content can be available on an intranet, internet, or can be local content.

With reference to the embodiments described below, an example content site with channels of video content is presented for illustrative purposed only. It is to be appreciated that any suitable type of content can be employed in sets of elements.

Referring now to the drawings, FIG. 1 depicts a system 100 that generates sorted lists of channels of video content for presentation to a plurality of client devices 180 based upon demographics. System 100 includes a content server 110 that provides channels of video content to client devices 180 remotely. In addition, content server 110 receives or accesses video content from a plurality of content providers 170. Furthermore, content server 110, client devices 180, and content providers 170 can receive input from users to control interaction with and presentation of content, for example, using input devices, non-limiting examples of which can be found with reference to FIG. 11.

Figure 11:
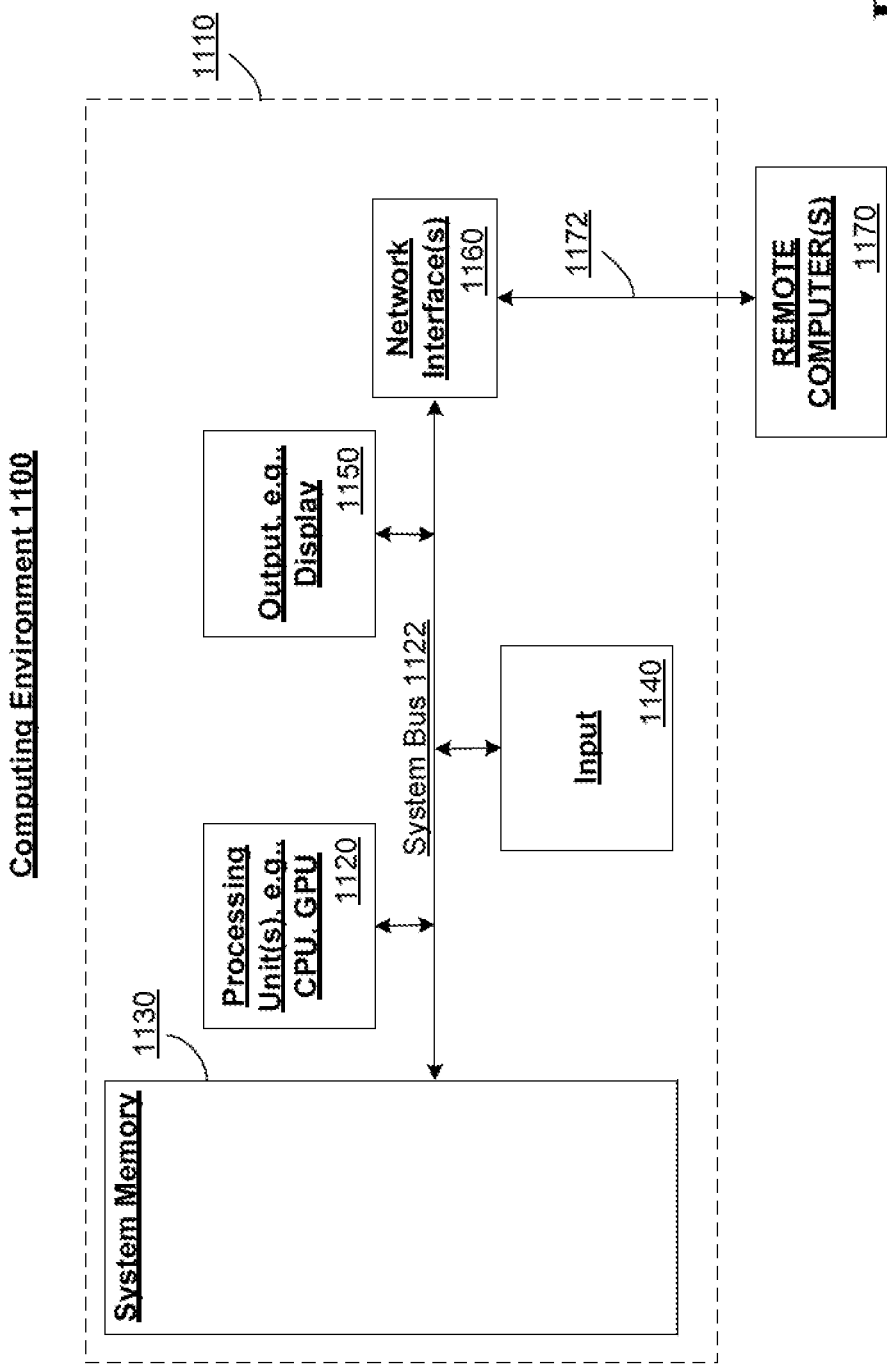
FIG. 11 is a block diagram representing an exemplary non-limiting computing system or operating environment in which the various embodiments can be implemented.

Content server 110, client device 180, and content provider 170, each respectively include a memory that stores computer executable components and a processor that executes computer executable components stored in the memory, a non-limiting example of which can be found with reference to FIG. 11. Client device 180 and content provider 170 can communicate via a wired and/or wireless network to content server 110. It is to be appreciated that while only one content server 110 is depicted, client device 180 and content provider 170 can communicate with a plurality of content servers 110 concurrently. Furthermore, while only two client devices 180 are depicted, it is to be appreciated that any suitable number of client devices 180 can concurrently interact with content server 110. Additionally, while only two content providers 170 are depicted, it is to be appreciated that any suitable number of content providers 170 can concurrently interact with content server 110.

Content server 110, client device 180, and content provider 170 can be any suitable type of device for interacting with or supplying content locally, or remotely over a wired or wireless communication link, non-limiting examples of include a wearable device or a non-wearable device. Wearable device can include, for example, heads-up display glasses, a monocle, eyeglasses, contact lens, sunglasses, a headset, a visor, a cap, a helmet, a mask, a headband, clothing, or any other suitable device that can be worn by a human or non-human user. Non-wearable device can include, for example, a mobile device, a mobile phone, a camera, a camcorder, a video camera, personal data assistant, laptop computer, tablet computer, desktop computer, server system, cable set top box, satellite set top box, cable modem, television set, monitor, media extender device, blu-ray device, DVD (digital versatile disc or digital video disc) device, compact disc device, video game system, portable video game console, audio/video receiver, radio device, portable music player, navigation system, car stereo, or any other suitable device. Moreover, content server 110, client device 180, and content provider 170 can include a user interface (e.g., a web browser or application), that can receive and present displays and content generated locally or remotely.

Content server 110 includes a demographics component 120 that obtains demographic information for one or more users. Content server 110 further includes set identification component 130 that identifies one or more sets of channels of video content. In addition, content server 110 includes a set sorting component 140 that generates a sort order for channels within a set based upon the demographic information. Content server 110 also includes a set presentation component 150 that presents sorted sets of channels of video content to client devices 180 based upon the sort order. Additionally, content server 110 includes a data store 160 that can store content, as well as, data generated by demographics component 120, list generation component 230, set sorting component 140, set presentation component 150, client device 180, or content provider 170. Data store 160 can be stored on any suitable type of storage device, non-limiting examples of which are illustrated with reference to FIGS. 10 and 11.

With continued reference to FIG. 1, demographics component 120 obtains demographic information for one or more users. For example, a user can provide demographic information in a profile. In a further example, demographic information can be determined (or inferred) about the user with consent from the user, such as, based on data provided by the user, user interaction with content server 110, client devices 180 employed to interact with content server 110, or any other suitable source of data related to a user. In an additional example, demographic information can be obtained for one or more groups of users. Furthermore, where a user consents to the use of demographic information about the user, systems and methods can employ the consented to demographic information in features disclosed herein. Demographic information can be stored as a set of demographic parameters in respective user profiles associated with users, or in respective group profiles associated with groups of users.

Continuing with reference to FIG. 1, set identification component 130 identifies one or more sets of channels of video content. In an example, set identification component 130 receives a set of channels of video content from a remote device (e.g. a content provider 170 or a client device 180). In another example, set identification component 130 retrieves a predefined set of channels of video content from data store 160. It is to be appreciated that the predefined set of channels of video content can be a global set of channels associated with all users of content server 110, or one of a plurality of predefined set of channels of video content associated with respective users or groups of users of content server 110. It is to be appreciated that predefined sets of channels of video content can change over time as content is added, deleted, or modified on content server 110. In a further example, set identification component 130 can generate a set of channels of video content based upon demographic information associated with a user or group of users. In an embodiment, set identification component 130 initiates identification of one or more sets of channels of video content based upon user interaction with content server 110 through client device 180, for example, to access a channel guide or video content. In another embodiment, set identification component 130 initiates identification of one or more sets of channels of video content continuously, or at random or predefined intervals. In a further example, set identification component 130 initiates identification of one or more sets of channels of video content in response to added, deleted, or modified content on content server 110. Set identification component 130 can initiate identification of one or more sets of channels of video content based upon any suitable criteria.

With continued reference to FIG. 1, set sorting component 140 obtains a set of channels of video content identified by set identification component 130 and produces a sorted set of channels of video content using a sorting algorithm that increases the likelihood of user selection of the entire set of elements or at least one element of the set. The sorting algorithm employs demographic information associated with a user or group of users to sort the set of channels of video content such when presented to the user or group of users in a sorted list of channels, the user or group of users is likely to select the set of channels or at least one channel from the set to achieve a desired outcome of the sorting algorithm (e.g., subscribe to any channel, purchase any content, employ any coupon, or any other suitable desired outcome). It is to be appreciated that any suitable sorting algorithm that increases the likelihood that a user or group of users will select an entire set of elements or at least one element of the set can be employed. In an embodiment, a sorting algorithm employs an element scoring algorithm that generates scores for elements in a set based upon target values and optionally weights, and employs a list generation algorithm that generates an ordered list of a plurality of elements of the set based upon respective element scores. In another embodiment, a sorting algorithm employs a combing algorithm that reorders an ordered list of elements over subsets of the elements.

Figure 2:
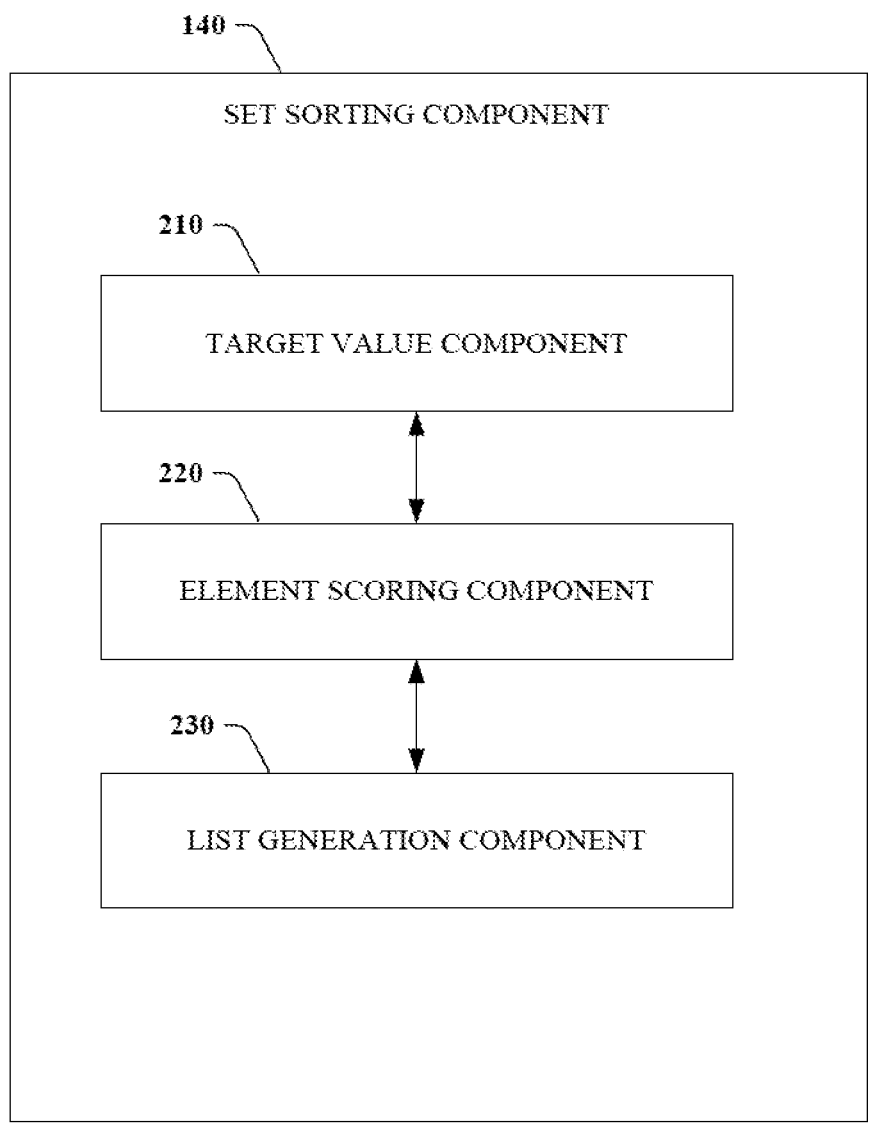
FIG. 2 illustrates a block diagram of an exemplary non-limiting set sorting component that generates a sorted set of channels of video content using a sorting algorithm that increases likelihood of user selection of the entire set of channels or at least one channel of the set in accordance with an implementation of this disclosure.

Referring to FIG. 2, set sorting component 140 includes a target value component 210 that generates target values for pairs of elements in a set of elements using a target value algorithm. Set sorting component 140 also includes an element scoring component 220 that generates scores for elements in a set. In addition, set sorting component 140 includes a list generation component 230 that generates an ordered list of elements.

Target value component 210 generates respective target values T for pairs of elements in a set of elements using a target value algorithm. A target value T is a normalized value for a demographic parameter P at which a first element E of a pair of elements (E, E') will be positioned higher in a sorted list than the second element E'. In an embodiment, target values T can initially be set to a predefined value, such as zero or an estimated value by the system or a system administrator. In another embodiment, target values T can initially be set to a random value. Target value T can initially be set to any suitable value. It is to be appreciated that the target value algorithm can be executed in response to user selection of at least one element in a set of elements presented to the user. As such, user selection of the at least element will cause the target value algorithm to adjust target values, thereby learning relationships of the elements to values of the demographic parameters. Optionally, a weight W can also be generated for the target value T to be employed when generating a score for an element E. In an embodiment, weight W can initially be set to a predefined value, such as zero or an estimated value by the system or a system administrator. In another embodiment, weight W can initially be set to a random value. Weight W can initially be set to any suitable value.

The following is an example target value algorithm for generating target values and weights for a set of elements $\{E_1, \ldots E_N\}$ for which a user or group of users selected at least one element in the set.

---
Example target value algorithm
---
```
i = 1
While i ≤ N
    j = 1
    While j ≤ N
        k = 1
        While k ≤ M
            Obtain D_k
            If E_i has a higher position in the set than E_k then:
                adjust_T_ijk by an amount TA towards D_k
                adjust_W_ijk by an amount WA
            Generate vector (E_i, E_j, P_k, T_ijk, W_ijk)
            k = i + 1
        j = j + 1
    i = i + 1
```
---

Where i, j, and k, are positive integers, E are elements in the set $\{E_1, \ldots E_N\}$, P are demographic parameters in a set of demographic parameters $\{P_1, \ldots P_M\}$ associated with a user or group of users, N is a positive integer representing the number of elements E in the set, M is a positive integer representing the number of demographic parameters P associated with the user or group of users, D is a value from 0 to 1 representing a normalized value of P for the user or group of users, T is a number from 0 to 1 representing a normalized target value of a demographic parameter $P_k$ at which an element $E_i$ is higher in a list than element $E_j$, W is a weight associated with T, TA defines an amount to adjust T towards D, and WA defines an amount to adjust W.

It is to be appreciated that TA can be a number, percentage, or function. In an embodiment, past values D for P when a user has selected of at least one element in a set of elements presented to the user can be stored. The stored past values D can be averaged for P, and T can be adjusted an amount TA towards the average value D for P. It is to be appreciated that T can be adjusted by any suitable amount TA.

It is to be appreciated that WA can be a number, percentage, or function. In an embodiment, the difference between T and U is determined for P. If the difference between T and U is below a threshold WAT, then W is increased by an amount WA, and if the difference between T and U is greater than or equal to the threshold WAT, then W is decreased by an amount WA. In another embodiment. W can be adjusted an amount WA inversely proportional to the difference between T and U. It is to be appreciated that W can be adjusted by any suitable amount WA. Furthermore, adjusting weights W can be optional depending on whether weights W are employed for determining element scores.

Continuing with reference to FIG. 2, element scoring component 220 generates scores for elements in a set based upon the target values and optionally weights using an element scoring algorithm. In an embodiment, element scoring component 220 initiates generating scores for elements based upon user interaction with content server 110 through client device 180, for example, to access a channel guide or video content. In another embodiment, set identification component 130 initiates generating scores for elements continuously, or at random or predefined intervals. In a further example, set identification component 130 initiates generating scores for elements in response to added, deleted, or modified content on content server 110. Set identification component 130 can initiate generating scores for elements based upon any suitable criteria.

The following is an example element scoring algorithm for generating respective scores for a set of elements $\{E_1, \ldots E_N\}$.

Example Element Scoring Algorithm
i=1
A=0
While i≤N
$S_i$=0
j=1
While j≤N
  k=1
  While k≤M
    Obtain vector $(E_i, E_j, P_k, T_{ijk}, W_{ijk})$
    Obtain $D_k$
    $VP_{ijk}=|D_k-T_{ijk}|$
    $NVP_{ijk}=(1/(1+VP_{ijk}))-1$
    $S_i=S_i+(NVP_{ijk}*W_{ijk})$
    k=k+1
  j=j+1
A=A+$S_i$
i=i+1

Where VP is the absolute value of the delta between D and T, NVP is a value from 0 to 1 representing the normalized value of VP, S is the weighted score for an element E, A is the sum of S for all elements in the set of elements $\{E_1, \ldots E_N\}$. It is to be appreciated that employing weights W in determining S is optional. Where weights are not employed. $S_i=S_i+NVP_{ijk}$ in the example element scoring algorithm.

In another embodiment element scoring algorithm can employ a factor F that skews the score S to favor smaller differences between D and T or larger differences between D and T. The following is an example element scoring algorithm for generating respective scores for a set of elements $\{E_1, \ldots E_N\}$ that employs F.

Example Element Scoring Algorithm Employing F
i=1
A=0
While i≤N
$S_i$=0
j=1
While j≤N
  k=1
  While k≤M
    Obtain vector $(E_i, E_j, P_k, T_{ijk}, W_{ijk})$
    Obtain $D_k$
    $NVP_{ijk}=((1/(1+VP_{ijk}))-1)$
    $S_i=S_i+(NVP_{ijk}*W_{ijk})$
    k=k+1
  j=j+1
A=A+$S_i$
i=i+1

If F is greater than 1, then NVP will be skewed towards zero, and if F is greater than zero and less than 1, then NVP will be skewed towards 1. In an embodiment, F is selected by a system administrator. In another embodiment, F is set by the system based upon a number of times a pair of elements is included in a set of elements presented to a user where a user has selected at least one element from the set. In a further embodiment, F can be based upon W. It is to be appreciated that any suitable mechanism for setting or determining F can be employed.

List generation component 230 employs the element scores to generate an ordered list L having Q number of slots of elements from a set of elements $\{E_1, E_N\}$ using a list generation algorithm. In an embodiment. Q can equal N so as to order the entire set of elements $\{E_1, \ldots E_N\}$. In another embodiment, Q can be equal to a number less than N to generate an order list L containing a subset of the set of elements $\{E_1, \ldots E_N\}$. The following is an example list generation algorithm.

Example List Generation Algorithm
x=1
Obtain A
PS=A*R
While x≤Q
  i=1
  While i≤N
    Obtain $S_i$
    If $E_i$ is not already in L then
      PS=PS−$S_i$
    If PS≤0 then
      A=A−$S_i$
      PS=A*R
      place $E_i$ in slot $L_x$
    i=i+1
  x=x+1

Where x is a positive integer, PS is a picking score used for picking elements to add to ordered list L, and R is a random number.

Set sorting component 140 can reorder an ordered list L having N number of slots of elements $\{E_1, \ldots E_N\}$ using a combing algorithm over subsets of elements of size C in order to provide greater granular precision of the ordered list L. Set sorting component 140 can reorder an ordered list L any suitable number of times using any suitable subset size C. The following is an example combing algorithm.

| Combing Algorithm for generating reordered list |
| --- |
| x = 1<br>While x ≤ N<br>  A = 0<br>  i = x<br>  While i ≤ (x + C)<br>    $S_i$ = 0<br>    j = x<br>    While j ≤ (x + C)<br>      k = 1<br>      While k ≤ M<br>        Obtain vector $(E_i, E_j, P_k, T_{ijk}, W_{ijk})$<br>        Obtain $D_k$<br>        $VP_{ijk} = \|D_k - T_{ijk}\|$<br>        $NVP_{ijk} = (1 / (1 + VP_{ijk})) - 1$<br>        $S_i = S_i + (NVP_{ijk} * W_{ijk})$<br>        k = k + 1<br>      j = j + 1<br>    A = A + $S_i$<br>    i = i + 1<br>  y = x<br>  store elements $E_i$ to $E_{i+C}$ in temporary storage<br>  clear slots $L_i$ to $L_{i+C}$<br>  PS = A * R<br>  While y ≤ (x +C)<br>    i = x<br>    While i ≤ (x + C)<br>      Obtain $S_i$<br>      If $E_i$ is not already in L then |

-continued

Combing Algorithm for generating reordered list $$PS = PS - S_i$$
$$\text{If } PS \leq 0 \text{ then}$$
$$A = A - S_i$$
$$PS = A * R$$
$$\text{place } E_i \text{ in slot } L_y$$
$$i = i + 1$$
$$y = y + 1$$
$$x = x + C - 1$$

Where y is a positive integer.

Referring back to FIG. 1, set presentation component 150 can provide an ordered list L (e.g. list of channels) to client device(s) 150 for presentation to a user or group of users. Additionally, set presentation component 150 can receive selection data from client device(s) 150 indicating selection of at least one element (e.g. subscription to a channel) from list L. Furthermore, set presentation component 150 can receive selection data from client device(s) 150 indicating that no elements from list L were selected. Set presentation component 150 can associate selection data (e.g. channel subscriptions) with the set of elements in list L and/or with demographic information related to a user or group of users connected with client device(s) 150.

FIGS. 3-9D illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Figure 3:
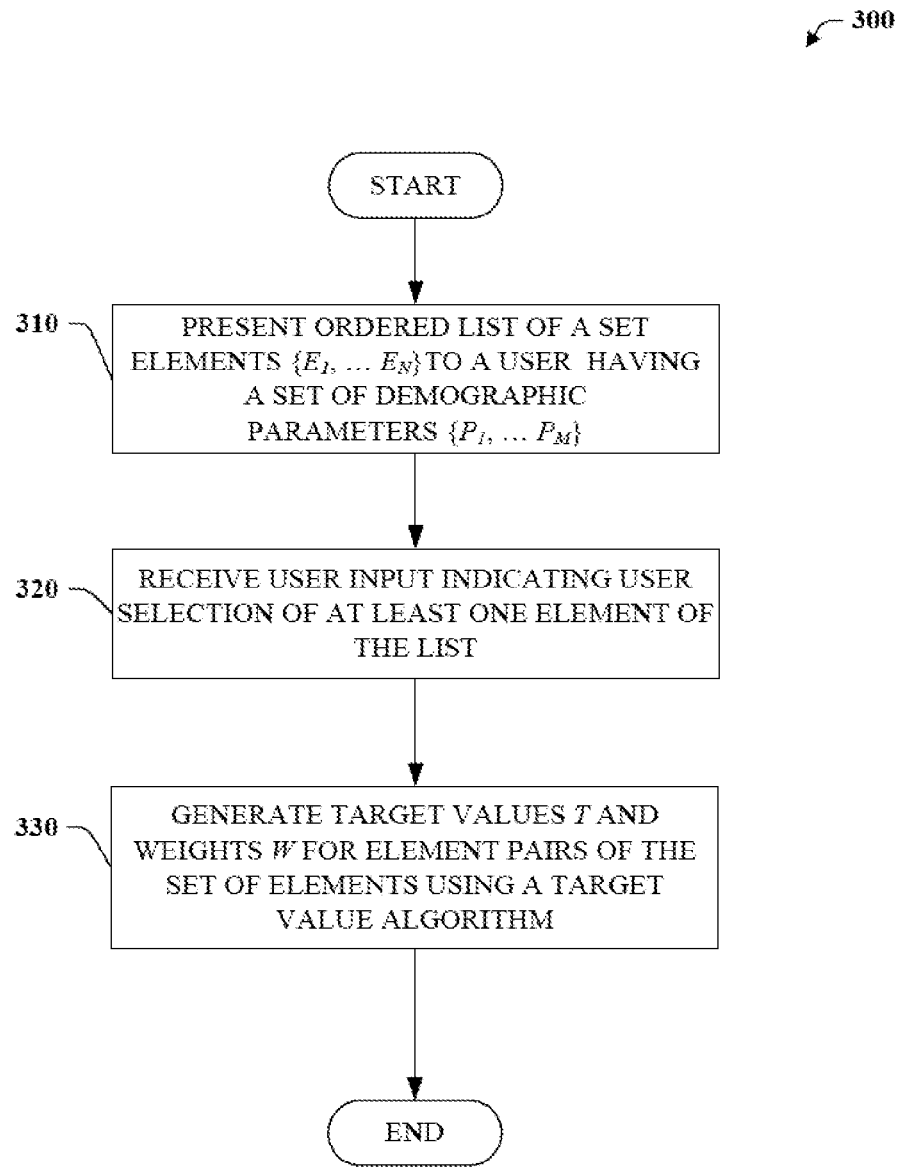
FIG. 3 illustrates an exemplary non-limiting flow diagram for generating target values and weights for a set of demographic parameters associated with pairs of elements of a set of elements in accordance with an implementation of this disclosure.

Referring to FIG. 3, an exemplary method 300 for generating target values T and weights W for a set of demographic parameters $\{P_1, \ldots P_M\}$ associated with pairs of elements of a set of elements $\{E_1, \ldots E_N\}$ is depicted. At reference numeral 310, an ordered list of a set of elements $\{E_1, \ldots E_N\}$ is presented to a user having a set of demographic parameters $\{P_1, \ldots P_M\}$ (e.g. by a set presentation component 150 or content server 110). At reference numeral 320, user input is received indicating selection of at least one element of the list (e.g. by a set presentation component 150 or content server 110). At reference numeral 330, target values T and weights W for the set of demographic parameters $\{P_1, \ldots P_M\}$ associated with pairs of elements of the set of elements $\{E_1, \ldots E_N\}$ are generated using a target value algorithm (e.g. by a target value component 210, set sorting component 140, or content server 110).

Figure 4A:
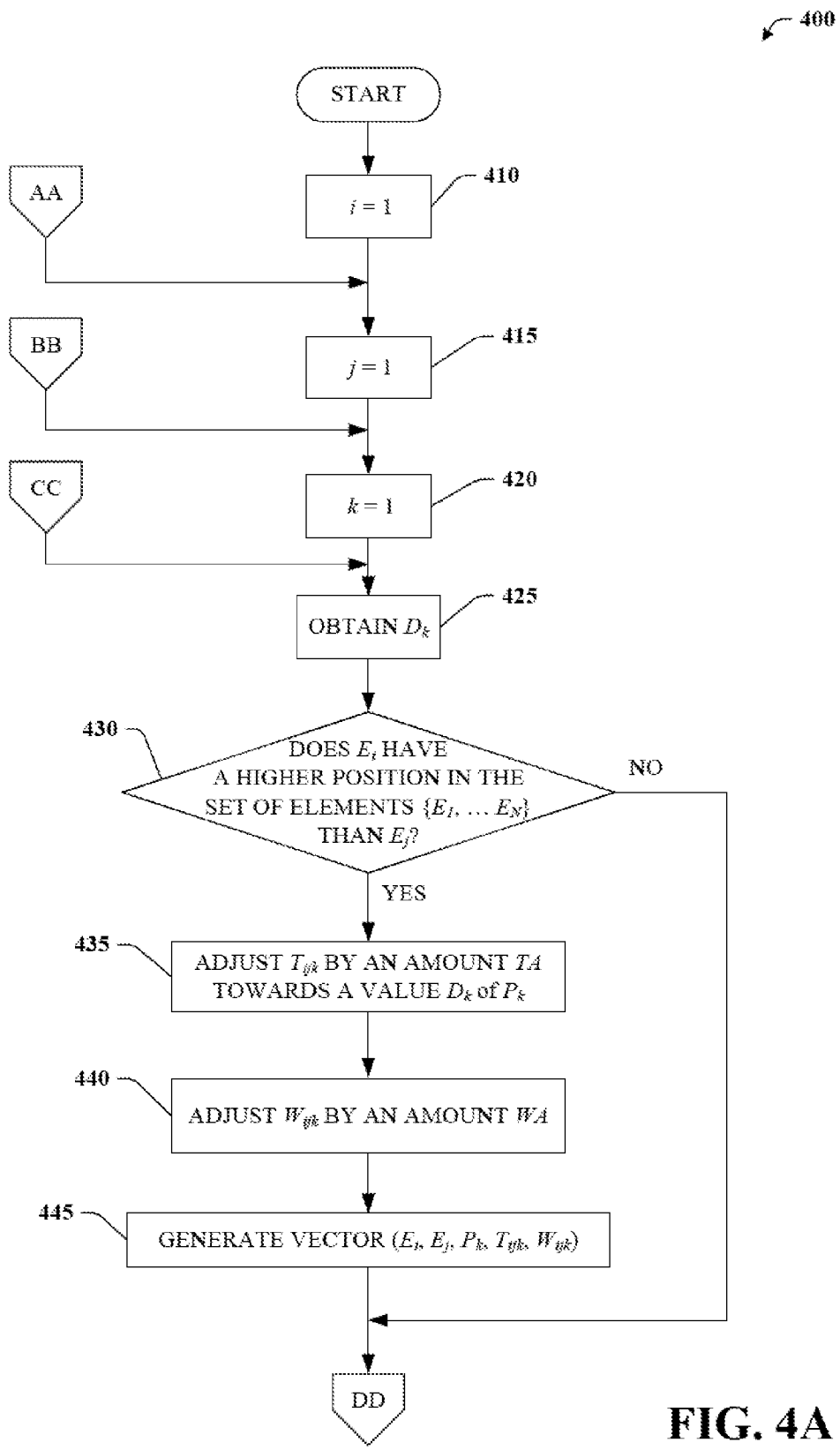
FIGS. 4A-4B illustrates an exemplary non-limiting flow diagram of a target value algorithm for generating target values and weights for a set of demographic parameters associated with pairs of elements of a set of elements in a list presented to a user in accordance with an implementation of this disclosure.
Figure 4B:
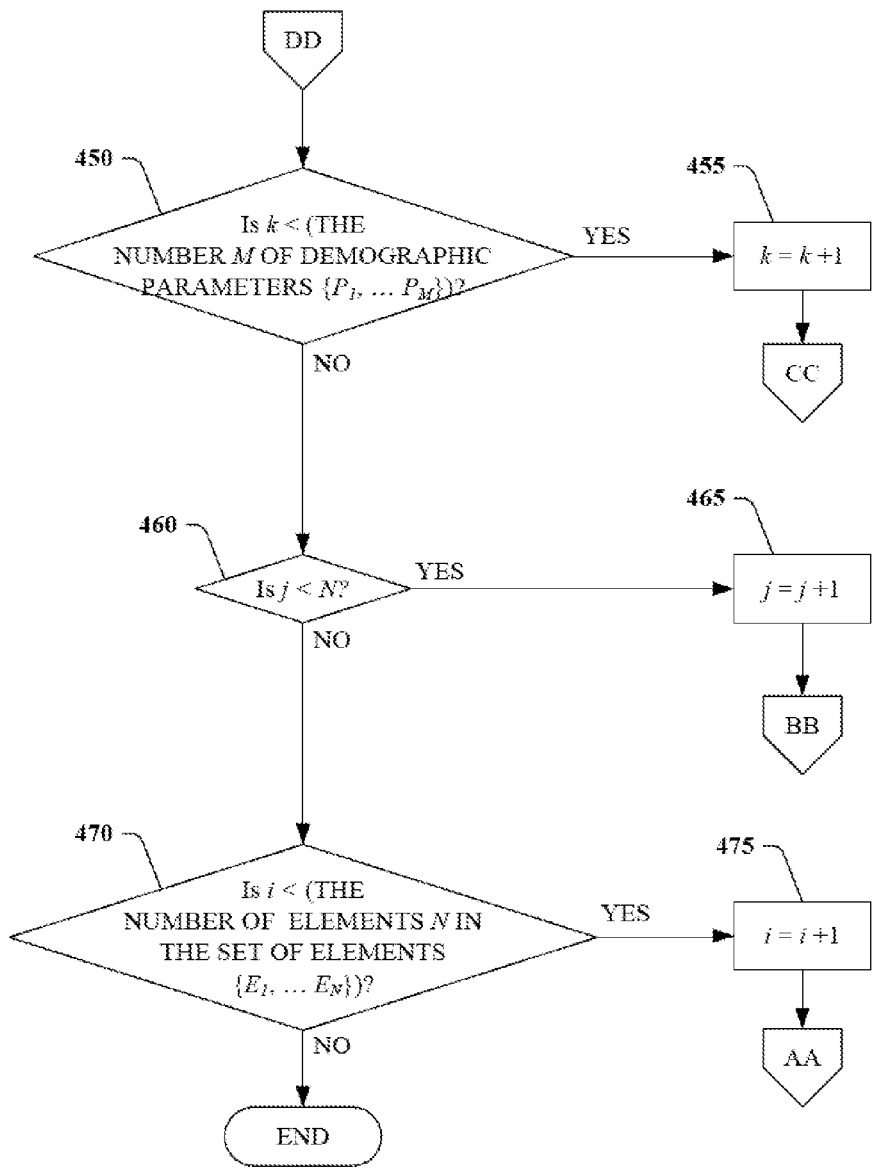

Referring to FIGS. 4A-4B, an exemplary method 400 using a target value algorithm for generating target values T and weights W for a set of demographic parameters $\{P_1, \ldots P_M\}$ associated with pairs of elements of a set of elements $\{E_1, \ldots E_N\}$ in a list presented to a user is depicted. Acts in method 400 can be performed, for example, by a target value component 210, set sorting component 140, or content server 110. At reference numeral 410, a loop counter i is set to 1. At reference numeral 415, a loop counter j is set to 1. At reference number 420, a loop counter k is set to 1. At reference numeral 425, a value $D_k$ for demographic parameter $P_k$ associated with the user is obtained. At reference numeral 430, a decision is made whether an element $E_i$ has a higher position in the list than $E_j$. If the decision is "NO", meaning $E_i$ does not have a higher position in the list than $E_j$, the method proceeds to reference numeral 450. If the decision is "YES", meaning $E_i$ has a higher position in the list than $E_j$, the method proceeds to reference numeral 435. At reference numeral 435, $T_{ijk}$ is adjusted by an amount TA towards the value of $D_k$. At reference numeral 440, $W_{ijk}$ is adjusted by an amount WA. At reference numeral 445, a vector $(E_i, E_j, P_k, T_{ijk}, W_{ijk})$ is generated. At reference numeral 450, a decision is made whether k is less than the number M of demographic parameters in the set $\{P_1, \ldots P_M\}$. If the decision is "NO", meaning k is not less than M, the method proceeds to reference numeral 460. If the decision is "YES", meaning k is less than M, the method proceeds to reference numeral 455. At reference numeral 455, k is set to k+1 and the method proceeds to reference numeral 425. At reference numeral 460, a decision is made whether j is less than the number N of elements in the set $\{E_i, \ldots E_N\}$. If the decision is "NO", meaning j is not less than N, the method proceeds to reference numeral 470. If the decision is "NO", meaning i is not less than N, the method ends. If the decision is "YES", meaning j is less than N, the method proceeds to reference numeral 465. At reference numeral 465, j is set to j+1 and the method proceeds to reference numeral 420. At reference numeral 470, a decision is made whether i is less than N. If the decision is "YES", meaning i is less than N, the method proceeds to reference numeral 475. At reference numeral 475, i is set to i+1 and the method proceeds to reference numeral 415.

Figure 5:
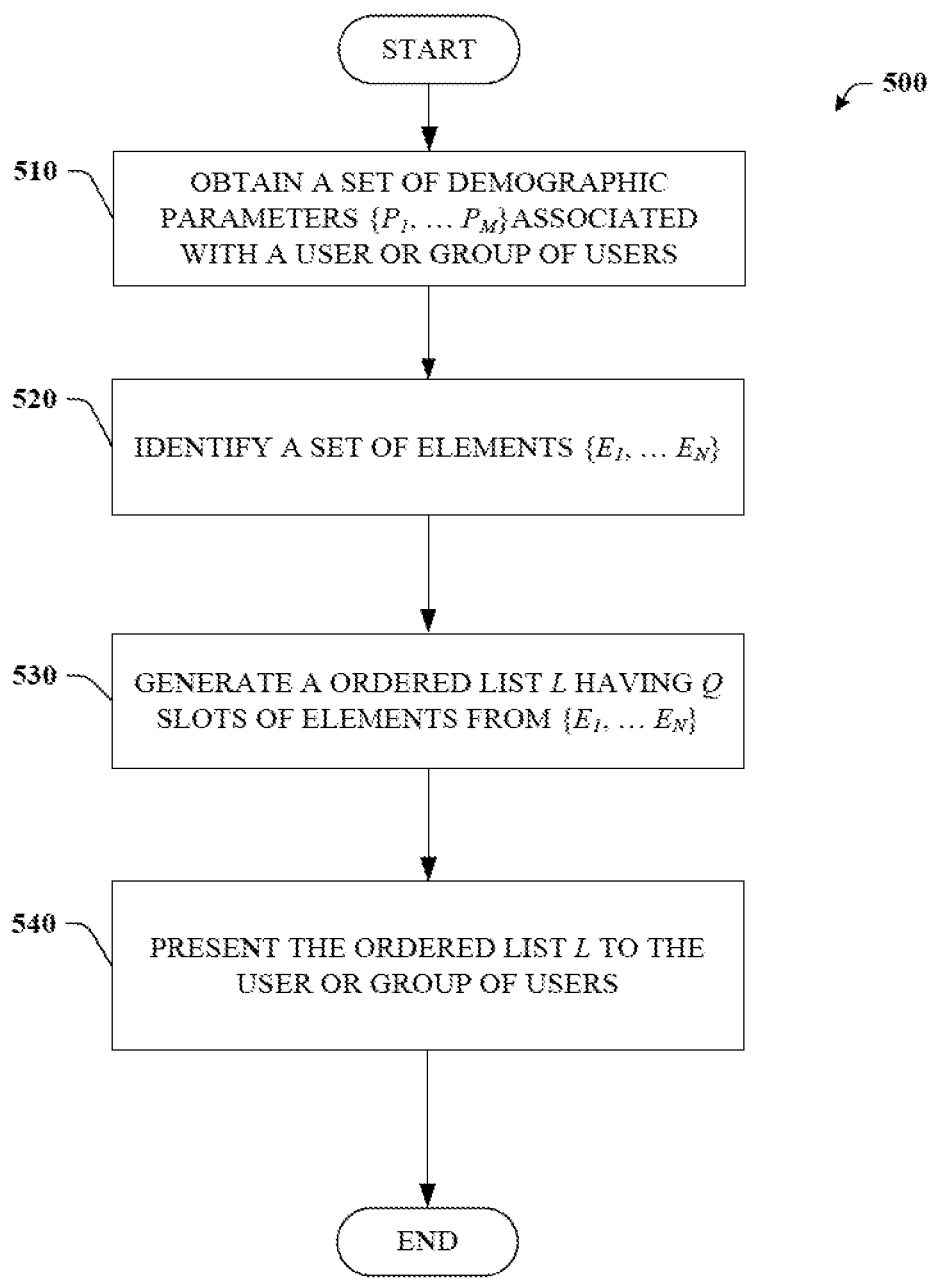
FIG. 5 illustrates an exemplary non-limiting flow diagram for presenting an ordered list of elements in accordance with an implementation of this disclosure.

Referring to FIG. 5, an exemplary method 500 for presenting an ordered list L of Q slots of elements is depicted. At reference numeral 510, a set of demographic parameters $\{P_1, \ldots P_M\}$ associated with a user or group of users is obtained (e.g. by a demographics component 120 or content server 110). At reference numeral 520, a set of elements $\{E_1, \ldots E_N\}$ is identified (e.g. by a set identification component 130 or content server 110). At reference numeral 530, an ordered list L of Q slots of elements from the set of elements $\{E_1, \ldots E_N\}$ is generated using a sorting algorithm (e.g. by a element scoring component 220, list generation component 230, set sorting component 140, or content server 110). At reference numeral 540, list L is presented to the user or group of users (e.g. by a set presentation component 150 or content server 110).

Figure 6:
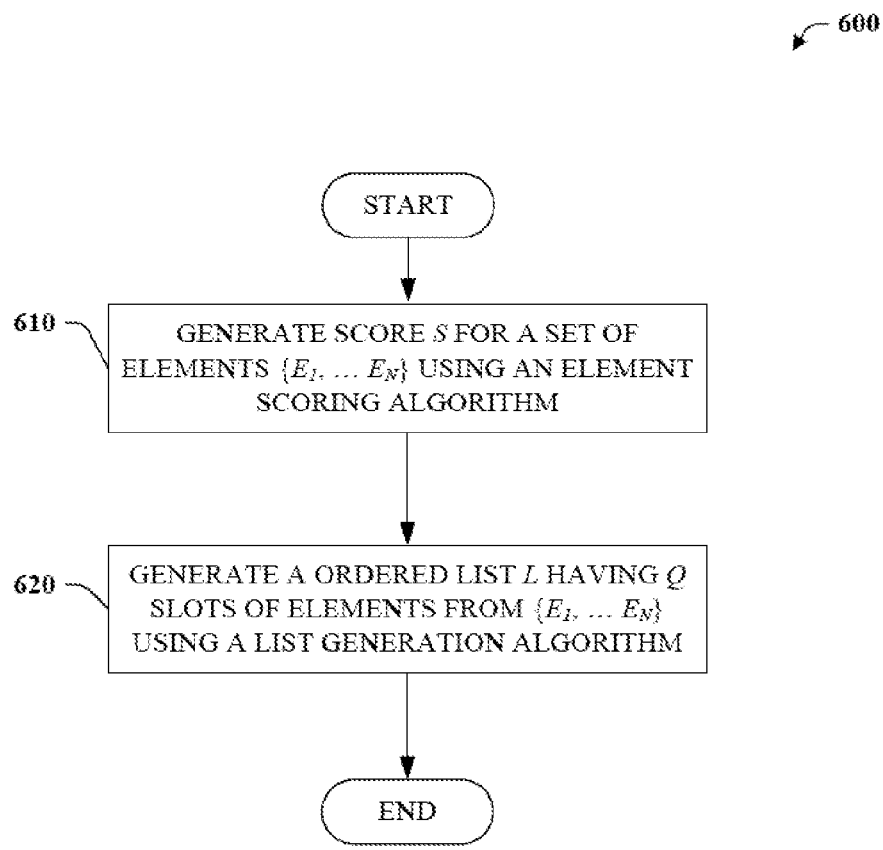
FIG. 6 illustrates an exemplary non-limiting flow diagram for generating an ordered list of elements in accordance with an implementation of this disclosure.

Referring to FIG. 6, an exemplary method 600 for generating an ordered list L of Q slots of elements is depicted. At reference numeral 610, a respective scores S for elements in a set of elements $\{E_1, \ldots E_N\}$ for a user or group of users having a set of demographic parameters $\{P_1, \ldots P_M\}$ are determined using an element scoring algorithm (e.g. by an element scoring component 220, set sorting component 140, or content server 110). At reference numeral 620, an ordered list L of Q slots of elements from the set of elements $\{E_1, \ldots E_N\}$ is generated using a list generation algorithm (e.g. by a list generation component 230, set sorting component 140, or content server 110).

Figure 7A:
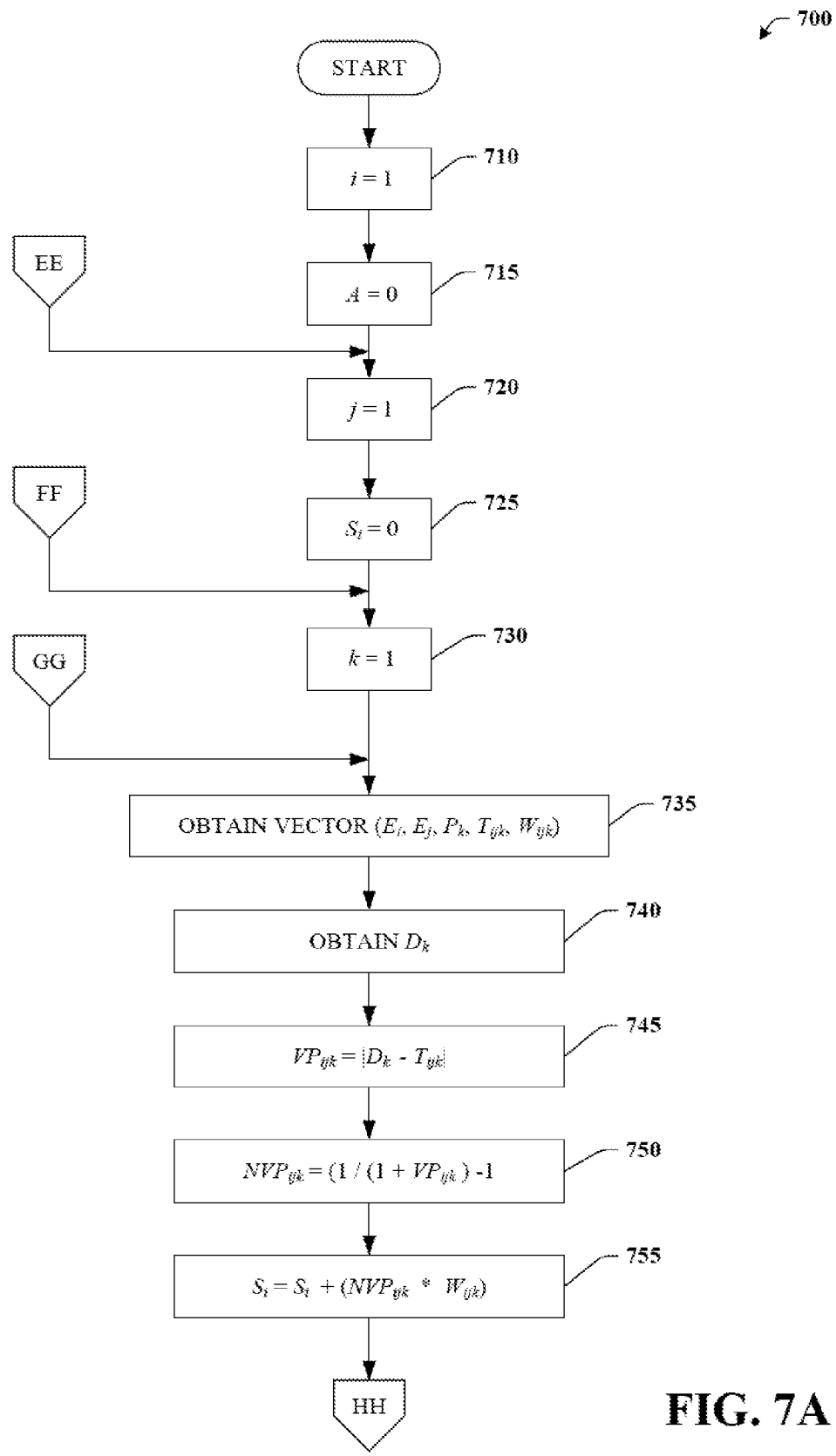
FIGS. 7A-7B illustrates an exemplary non-limiting flow diagram of an element scoring algorithm for determining respective scores for elements in a set of elements for a user or group of users having a set of demographic parameters in accordance with an implementation of this disclosure.
Figure 7B:
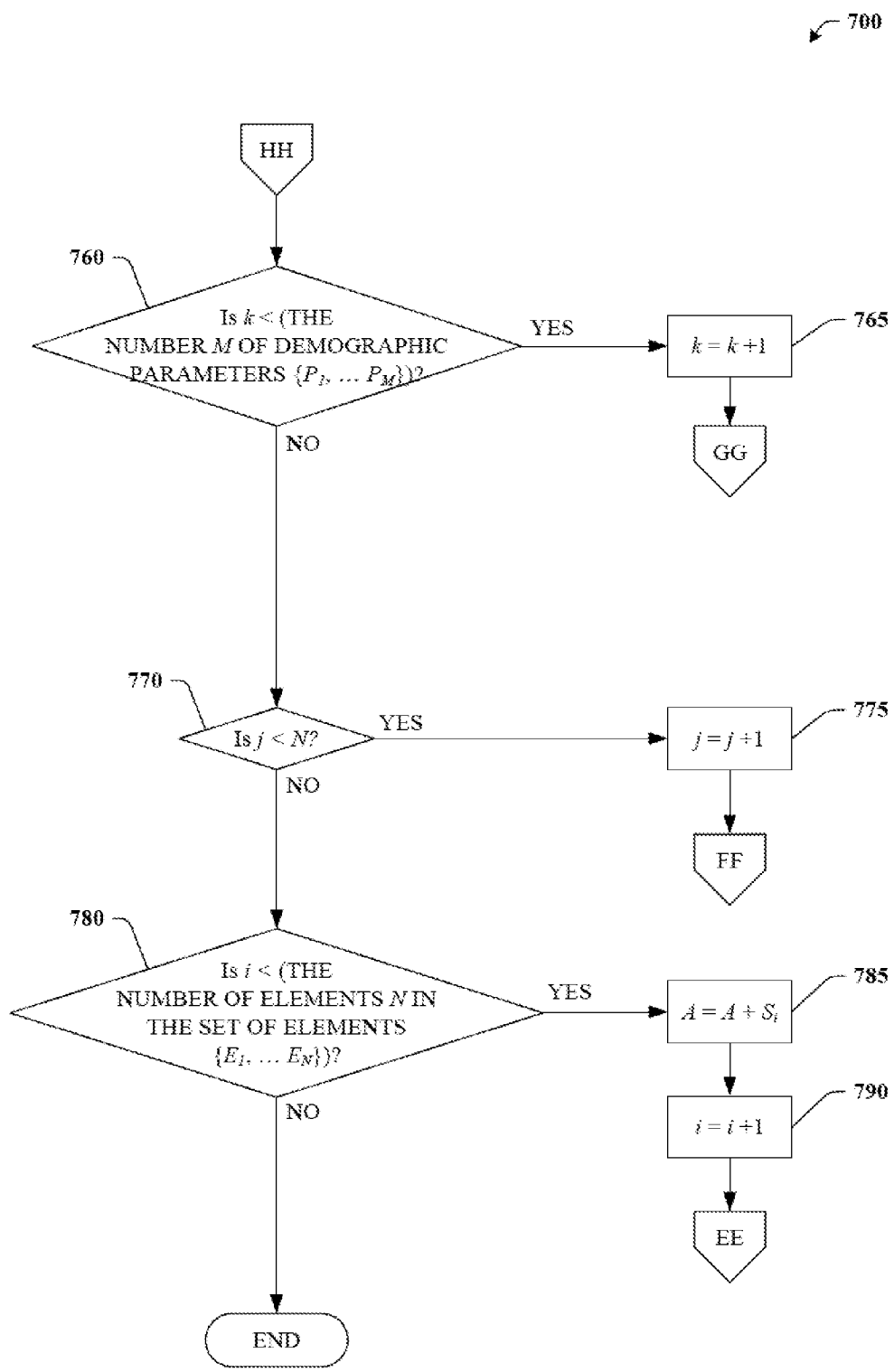

Referring to FIGS. 7A-7B, an exemplary method 700 using an element scoring algorithm for determining respective scores S for elements in a set of elements $\{E_1, \ldots E_N\}$ for a user or group of users having a set of demographic parameters $\{P_1, \ldots P_M\}$ is depicted. Acts in method 700 can be performed, for example, by an element scoring component 220, set sorting component 140, or content server 110. At reference numeral 710, a loop counter i is set to 1. At reference numeral 715, aggregate score A for totaling the sum of S for all elements in the set of elements $\{E_1, \ldots E_N\}$ is initialized to zero. At reference numeral 720, a loop counter j is set to 1. At reference numeral 725, a score $S_i$ for element $E_i$ is initialized to zero. At reference number 730, a loop counter k is set to 1. At reference numeral 735, vector $(E_i, E_j, P_k, T_{ijk}, W_{ijk})$ is obtained. At reference numeral 740, a value $D_k$ for demographic parameter $P_k$ associated with a user or group of users is obtained. At reference numeral 745, $VP_{ijk}$ is set to the absolute value of the delta between $D_k$ and $T_{ijk}$. At reference numeral 750, $NVP_{ijk}$ is set to $(1/(1+VP_{ijk})-1$. Optionally, when a factor F is employed, $NVP_{ijk}$ is set to $((1/(1+VP_{ijk})-1)^F$. At reference numeral 755, $S_i$ is set to $S_i+(NVP^{ijk}*W_{ijk})$. At reference numeral 760, a decision is made whether k is less than the number M of demographic parameters in the set $\{P_1, \ldots P_M\}$. If the decision is "NO", meaning k is not less than M, the method proceeds to reference numeral 770. If the decision is "YES", meaning k is less than M, the method proceeds to reference numeral 765. At reference numeral 765, k is set to k+1 and the method proceeds to reference numeral 735. At reference numeral 770, a decision is made whether j is less than the number N of elements in the set $\{E_1, \ldots E_N\}$. If the decision is "NO", meaning j is not less than N, the method proceeds to reference numeral 780. If the decision is "YES", meaning j is less than N, the method proceeds to reference numeral 775. At reference numeral 775, j is set to j+1 and the method proceeds to reference numeral 730. At reference numeral 780, a decision is made whether i is less than N. If the decision is "YES", meaning i is less than N, the method proceeds to reference numeral 785. If the decision is "NO", meaning i is not less than N, the method ends. At reference numeral 785, A is set to $A+S_i$. At reference numeral 790, i is set to i+1 and the method proceeds to reference numeral 720.

Figure 8A:
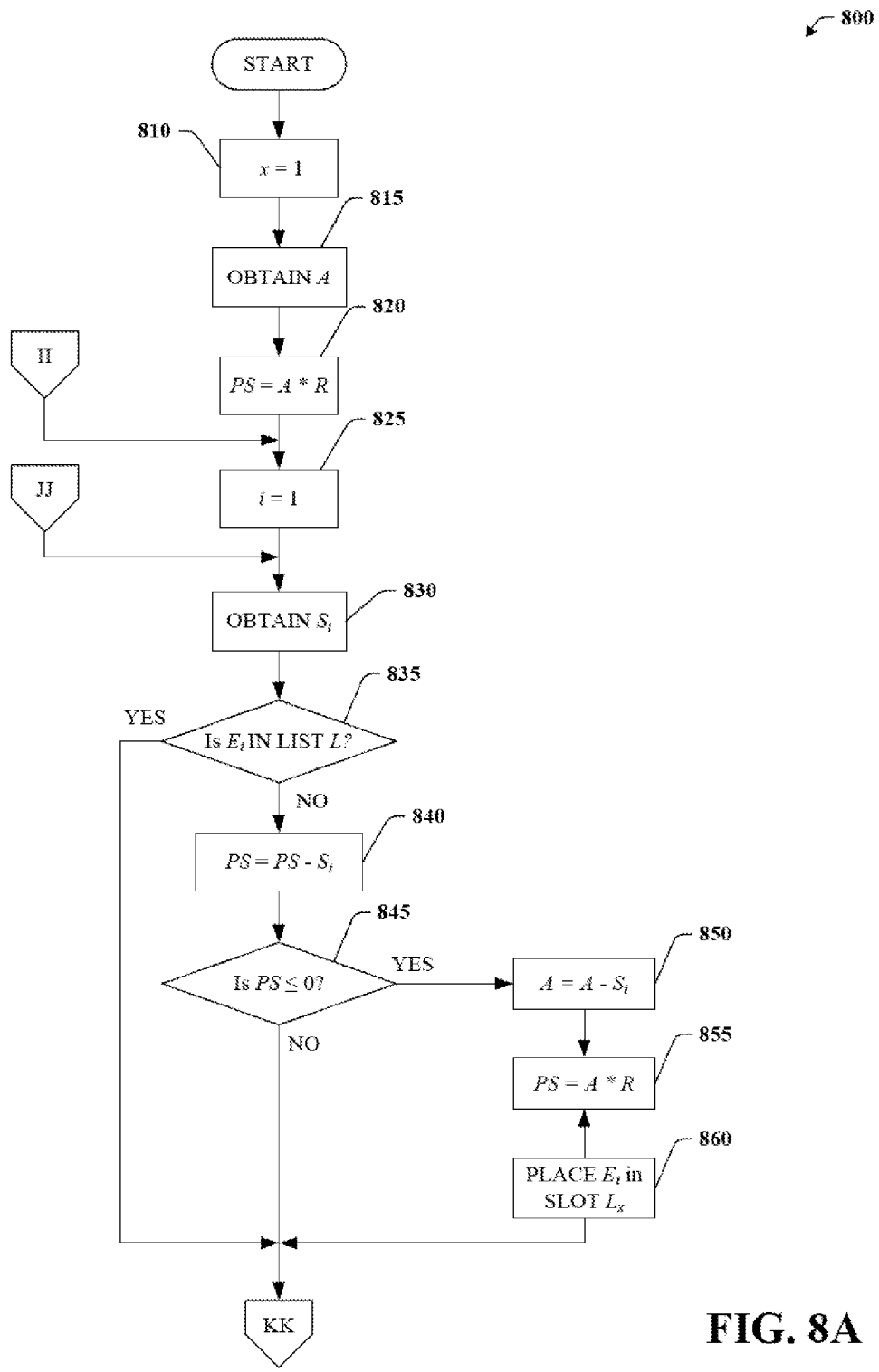
FIGS. 8A-8B illustrates an exemplary non-limiting flow diagram of a list generation algorithm for generating an ordered list of elements from a set of elements in accordance with an implementation of this disclosure.
Figure 8B:
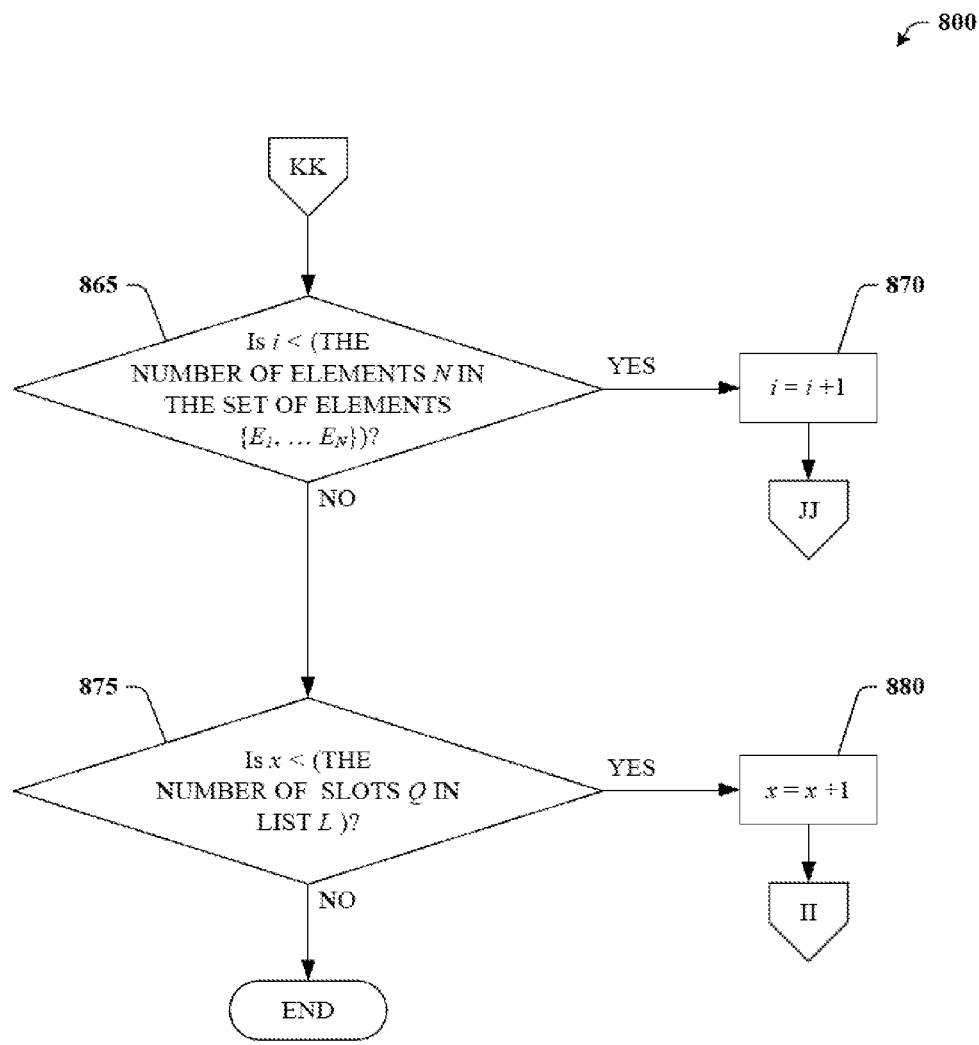
Figure 9A:
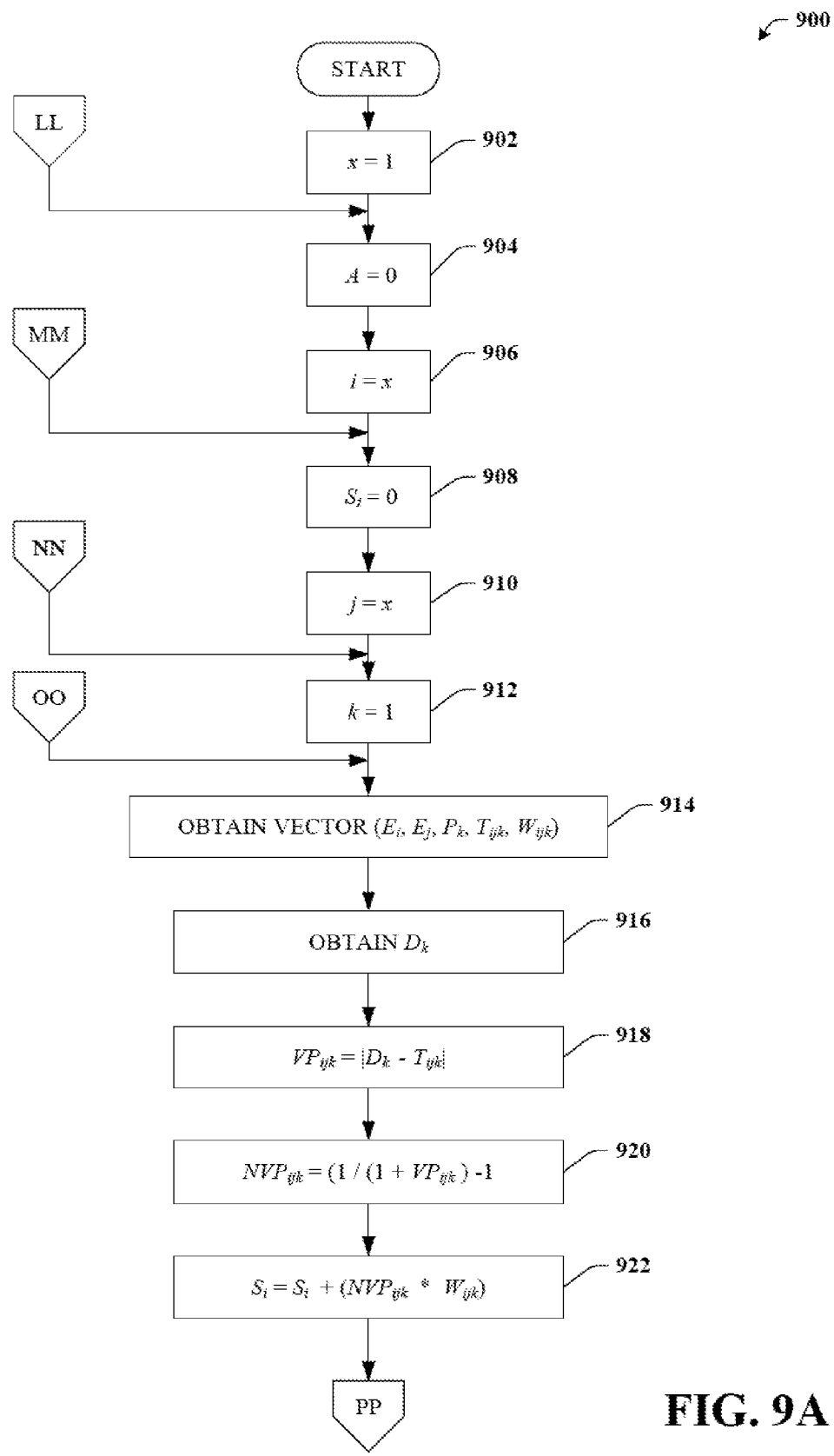
FIGS. 9A-9D illustrates an exemplary non-limiting flow diagram of a combing algorithm for granular reordering, using a predefined subset size, an ordered list of elements for a user or group of users having a set of demographic parameters in accordance with an implementation of this disclosure.
Figure 9B:
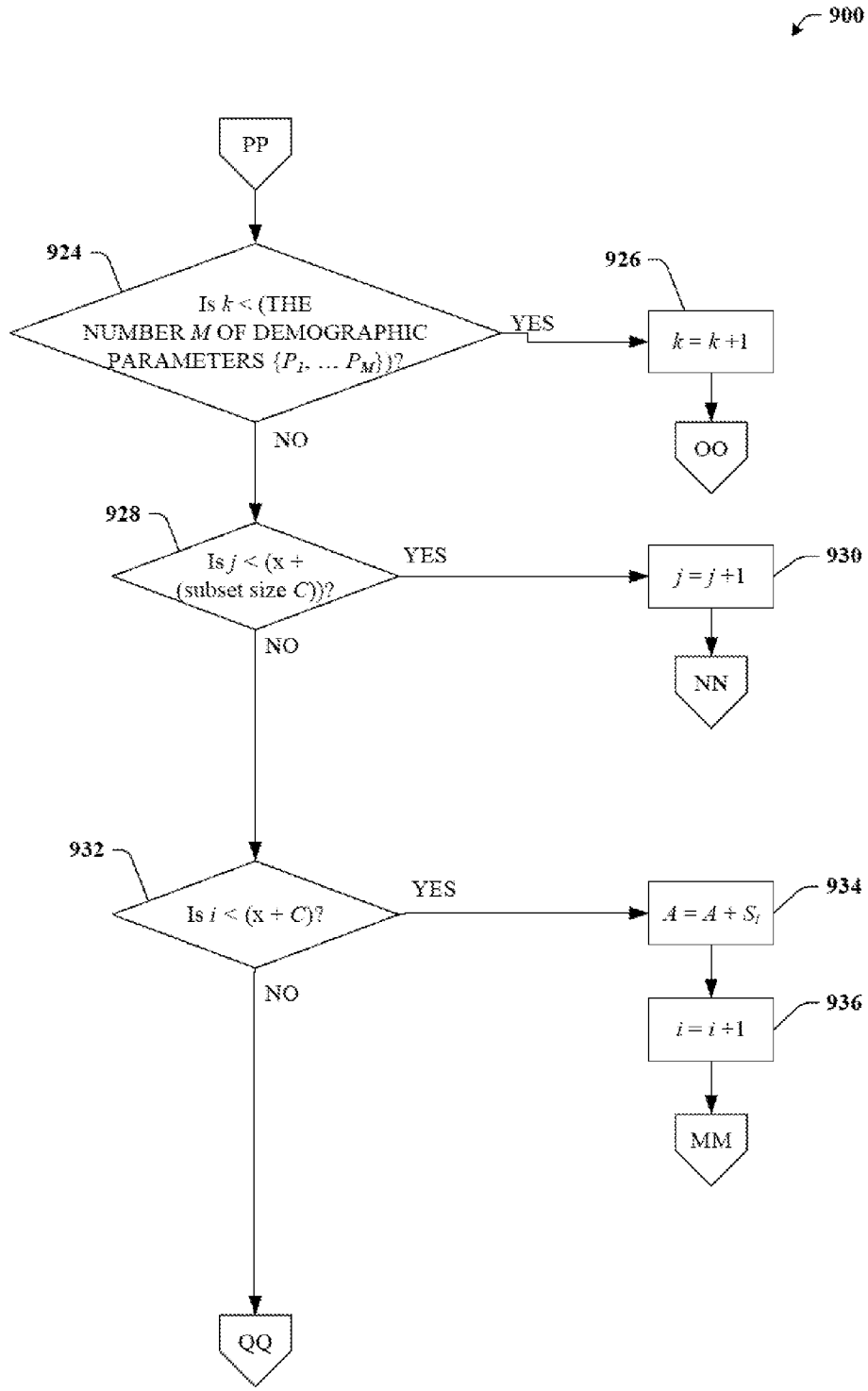
Figure 9C:
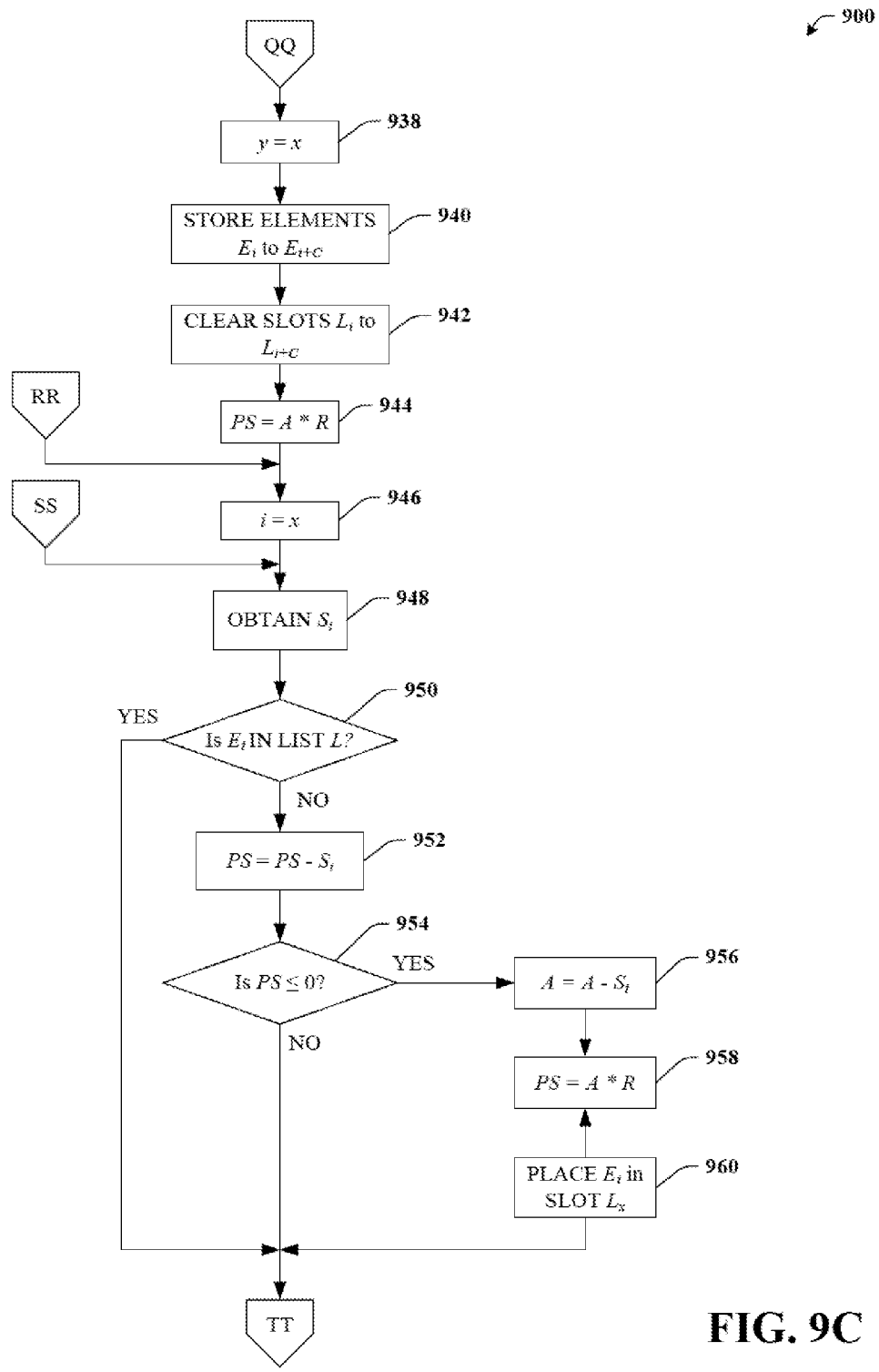
Figure 9D:
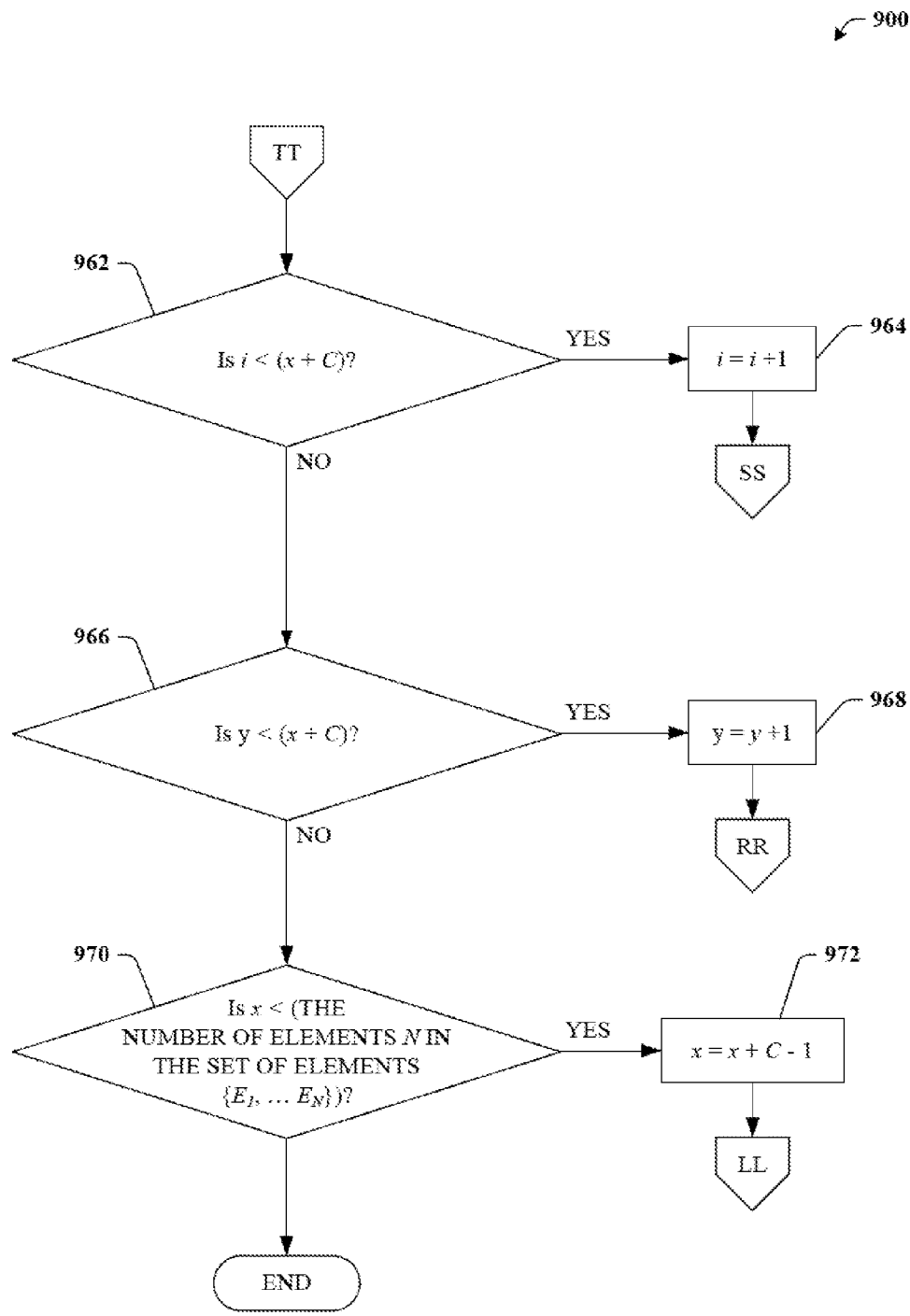

Referring to FIGS. 8A-8B, an exemplary method 800 using list generation algorithm for generating an ordered list L having Q slots of elements from the set of elements $\{E_1, \ldots E_N\}$ is depicted. Acts in method 800 can be performed, for example, by a list generation component 230, set sorting component 140, or content server 110. At reference numeral 810, a loop counter x is set to 1. At reference numeral 815, an aggregate score A for the sum of scores S for all elements in the set of elements $\{E_1, \ldots E_N\}$ is obtained. At reference numeral 820, a picking score PS is set to A multiplied by a random number R. At reference numeral 825, a loop counter i is set to 1. At reference numeral 830, a score $S_i$ for element $E_i$ is obtained. At reference numeral 835, a decision is made whether $E_i$ is already in list L. If the decision is "YES", meaning $E_i$ is already in list L, the method proceeds to reference numeral 865. If the decision is "NO", meaning $E_i$ is not in list L, the method proceeds to reference numeral 850. At reference numeral 840, PS is set to $PS-S_i$. At reference numeral 845, a decision is made whether PS is less than zero. If the decision is "YES", meaning PS is less than zero, the method proceeds to reference numeral 850. If the decision is "NO", meaning PS is not less than zero, the method proceeds to reference numeral 865. At reference numeral 850, A is set to $A-S_i$. At reference numeral 855, picking score PS is set to A*R. At reference numeral 860, element $E_i$ is placed in slot $L_x$. At reference numeral 865, a decision is made whether i is less than the number N of elements in the set $\{E_1, \ldots E_N\}$. If the decision is "NO", meaning i is not less than N, the method proceeds to reference numeral 875. If the decision is "YES", meaning i is less than N, the method proceeds to reference numeral 870. At reference numeral 870, i is set to i+1 and the method proceeds to reference numeral 830. At reference numeral 875, a decision is made whether x is less than number Q of slots in list L. If the decision is "YES", meaning x is less than Q, the method proceeds to reference numeral 880. If the decision is "NO", meaning x is not less than Q, the method ends. At reference numeral 880, x is set to x+1 and the method proceeds to reference numeral 825.

Referring to FIGS. 9A-9D, an exemplary method 900 using a combing algorithm for granular reordering, using a subset size of C, an ordered list L having a set of elements $\{E_1, \ldots E_N\}$ for a user or group of users having a set of demographic parameters $\{P_1, \ldots P_M\}$ is depicted. Acts in method 900 can be performed, for example, by a set sorting component 140 or content server 110. At reference numeral 902, a loop counter x is set to 1. At reference numeral 904, aggregate score A for totaling the stun of S for all elements in the set of elements $\{E_1, \ldots E_N\}$ is initialized to zero. At reference numeral 906, a loop counter i is set to x. At reference numeral 908, a score $S_i$ for element $E_i$ is initialized to zero. At reference numeral 910, a loop counter j is set to x. At reference number 912, a loop counter k is set to 1. At reference numeral 914, vector $(E_i, E_j, P_k, T_{ijk}, W_{ijk})$ is obtained. At reference numeral 916, a value $D_k$ for demographic parameter $P_k$ associated with a user or group of users is obtained. At reference numeral 918, $VP_{ijk}$ is set to the absolute value of the delta between $D_k$ and $T_{ijk}$. At reference numeral 920, $NVP_{ijk}$ is set to $(1/(1+VP_{ijk})-1$. Optionally, when a factor F is employed, $NVP_{ijk}$ is set to $((1/(1+VP_{ijk})-1)^F$. At reference numeral 922, $S_i$ is set to $S_i+(NVP_{ijk}*W_{ijk})$. At reference numeral 924, a decision is made whether k is less than the number M of demographic parameters in the set $\{P_1, \ldots P_M\}$. If the decision is "NO", meaning k is not less than M, the method proceeds to reference numeral 928. If the decision is "YES", meaning k is less than M, the method proceeds to reference numeral 926. At reference numeral 926, k is set to k+1 and the method proceeds to reference numeral 914. At reference numeral 928, a decision is made whether j is less than (x+C). If the decision is "NO", meaning j is not less than (x+C), the method proceeds to reference numeral 932. If the decision is "YES", meaning j is less than (x+C), the method proceeds to reference numeral 930. At reference numeral 930, j is set to j+1 and the method proceeds to reference numeral 912. At reference numeral 932, a decision is made whether i is less than (x+C). If the decision is "YES", meaning i is less than (x+C), the method proceeds to reference numeral 934. If the decision is "NO", meaning i is not less than (x+C), the method proceeds to reference numeral 938. At reference numeral 934, A is set to $A+S_i$. At reference numeral 936, i is set to i+1 and the method proceeds to reference numeral 908. At reference numeral 938, a loop counter y is set to x. At reference numeral 940, elements $E_i$ to $E_{i+C}$ in slots $L_i$ to $L_{i+C}$ are stored in a temporary storage. At reference numeral 942, slots $L_i$ to $L_{i+C}$ are cleared. At reference numeral 944, a picking score PS is set to A multiplied by a random number R. At reference numeral 946, a loop counter i is set to x. At reference numeral 948, a score $S_i$ for element $E_i$ is obtained. At reference numeral 950, a decision is made whether $E_i$ is already in list L. If the decision is "YES", meaning $E_i$ is already in list L, the method proceeds to reference numeral 962. If the decision is "NO", meaning $E_i$ is not in list L, the method proceeds to reference numeral 952. At reference numeral 952, PS is set to $PS-S_i$. At reference numeral 954, a decision is made whether PS is less than zero. If the decision is "YES", meaning PS is less than zero, the method proceeds to reference numeral 956. If the decision is "NO", meaning PS is not less than zero, the method proceeds to reference numeral 962. At reference numeral 956, A is set to $A-S_i$. At reference numeral 958, picking score PS is set to A*R. At reference numeral 960, element $E_i$ is placed in slot $L_x$. At reference numeral 962, a decision is made whether i is less than (x+C). If the decision is "NO", meaning i is not less than (x+C), the method proceeds to reference numeral 966. If the decision is "YES", meaning i is less than (x+C) ... the method proceeds to reference numeral 964. At reference numeral 964, i is set to i+1 and the method proceeds to reference numeral 948. At reference numeral 966, a decision is made whether y is less than number (x+C). If the decision is "YES", meaning y is less than (x+C), the method proceeds to reference numeral 968. If the decision is "NO", meaning y is not less than (x+C), the method proceeds to reference numeral 970. At reference numeral 968, y is set to y+1 and the method proceeds to reference numeral 946. At reference numeral 970, a decision is made whether x is less than the number N of elements in the set $\{E_1, \ldots E_N\}$. If the decision is "NO", meaning x is not less than N, the method ends. If the decision is "YES", meaning x is less than N, the method proceeds to reference numeral 972. At reference numeral 972, x is set to (x+C−1) and the method proceeds to reference numeral 904.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing ... expansion of resources, specialization of processing, and the like. Distributed computing takes advantage of network connectivity, allowing clients to leverage their collective power to benefit the entire enterprise. In this regard ... a variety of devices may have applications, objects or resources that may participate in the various embodiments of this disclosure.

Figure 10:
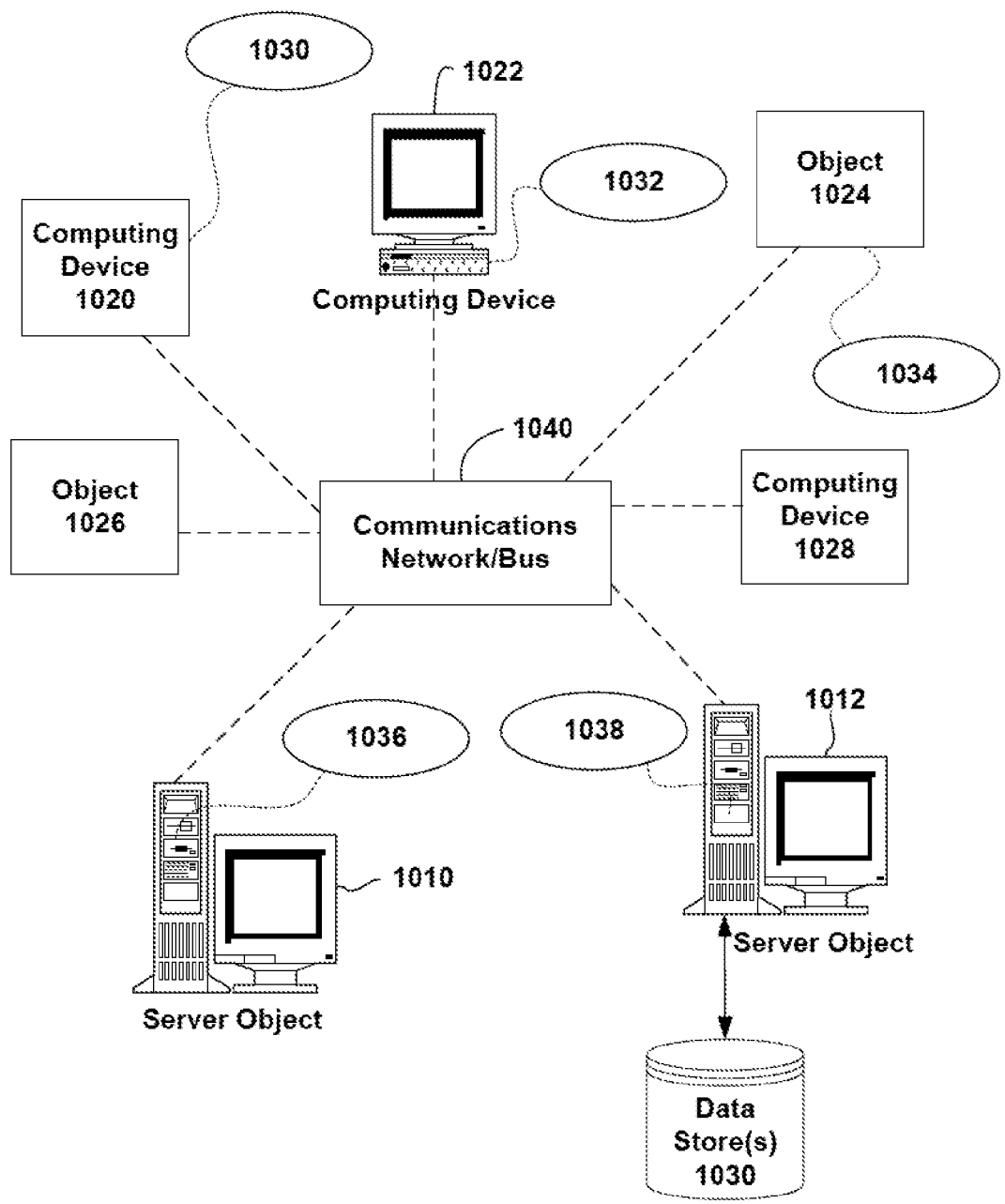
FIG. 10 is a block diagram representing an exemplary non-limiting networked environment in which the various embodiments can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that computing objects 1010, 1012, etc. and computing objects or devices 1020, 1022, 1024, 1026, 1028, etc. may comprise different devices, such as personal digital assistants (PDAs), audio/video devices, mobile phones. MP3 players, personal computers, laptops ... tablets, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each computing object 1010, 1012, etc. or computing objects or devices 1020, 1022, 1024, 1026, 1028, etc. can also contain an application, such as applications 1030, 1032, 1034, 1036, 1038, that might make use of an APL or other object, software, firmware and/or hardware, suitable for communication with or implementation of various embodiments of this disclosure.

There are a variety of systems, components ... and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1040 is the Internet, for example, the computing objects 1010, 1012, etc. can be Web servers, file servers, media servers, etc. with which the client computing objects or devices 1020, 1022, 1024, 1026, 1028, etc. communicate via any of a number of known protocols, such as the hypertext transfer protocol (HTTP). Objects 1010, 1012, etc. may also serve as client computing objects or devices 1020, 1022, 1024, 1026, 1028, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 11 is but one example of a computing device that can be employed with implementing one or more of the systems or methods shown and described in connection with FIGS. 1-8 Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither is the computing environment 1100 be interpreted as having any dependency or requirement relating to any one or combination of components illustrated in the exemplary operating environment 1100.

With reference to FIG. 11, an exemplary computing device for implementing one or more embodiments in the form of a computer 1110 is depicted. Components of computer 1110 may include, but are not limited to, a processing unit 1120, a system memory 1130, and a system bus 1122 that couples various system components including the system memory to the processing unit 1120.

Computer 1110 typically includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, system memory 1130 may also include an operating system, application programs, other program modules, and program data.

A user can enter commands and information into the computer 1110 through input devices 1140, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1110. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM. ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

The following is sample pseudo code for an exemplary sorting algorithm suitable for use by set sorting component 140:

--- elements = set<element>( ) # set of elements to be sorted
user_variables = map<variable, value>( ) # value is a number between 0 and 1 representing a demographic parameter associated with a variable.

```
pickiness:float = 2 # adjustable value for how picky to be. Higher values
will favor smaller deltas between user variables and element target values
get_final_element_ordering(elements, user_variables)
def get_final_element_ordering(set<element> elements, map<variable,
float>user_variables):
    comb_pick_element_ordering(get_final_element_ordering(elements,
user_variables), 3)
def comb_pick_element_ordering(list<element> elements, map<variable,
float> user_variables, comb_size=3):
    if comb_size <= 1
        return
    for i in xrange(0, len(elements), comb_size-1):
        elements[i,i+comb_size] = pick_element_ordering(elements[i,
i+comb_size], user_variables)
def pick_element_ordering(set<element> elements, map<variable, float>
user_variables):
    map<element,map<element, map<variable,(target_value, weight)>>
element_score = { }
    map<element,float> element_indidivual_score = { }
    for element in elements:
        element_score[element] = get_element_score_from_db(element)
    for element, element_variable_score_map in element_score:
        score = 0
        for element2, values in element_variable_score_map:
            for variable, values in scores:
                variable_delta = abs(user_variables[variable] –
values[target_value])
                vd = (1/(1+variable_delta))–1 # this will turn the delta into a
value between 0 and 1, 1 being higher.
                score += vd*values[weight]
            element_indidivual_score[element] = score
            aggregate_score += score
    ordered_list = list<element>( )
    pick_score = Math.random( )*aggregate_score
    while len(ordered_list) < len(element_indidivaul_score):
        for element, score in element_indidivual_score:
            if element in ordered_list:
                continue
            pick_score -= score
            if pick_score <= 0:
                aggregate_score -= score
                pick_score = Math.random( )*aggregate_score
                ordered_list.append(element)
return ordered_list
```

What is claimed is:

1. A system, comprising:
a memory that has stored thereon computer executable components;
a microprocessor that executes the following computer executable components stored in the memory:
a demographics component configured to obtain at least one demographic parameter $\{P_1, \ldots P_M\}$ associated with at least one user;
a set identification component configured to identify a set of channels $\{E_1, \ldots E_N\}$; and
a set sorting component configured to employ a sorting algorithm to generate a list comprising a subset of the channels in an order defined to increase a likelihood that at least one channel of the subset of channels will be selected for subscription, wherein the sorting algorithm comprises an element scoring algorithm comprising:

```
i = 1,
A = 0,
while i ≤ N,
    S_i = 0,
    j = 1,
    while j ≤ N,
        k = 1,
        while k ≤ M,
            obtain vector (E_i, E_j, P_k, T_ijk, W_ijk),
            obtain D_k,
            VP_ijk = |D_k – T_ijk|,
            NVP_ijk = (1 / (1 + VP_ijk)) – 1,
            S_i = S_i + (NVP_ijk * W_ijk),
            k = k + 1,
        j = j + 1,
    A = A + S_i,
    i = i + 1,
``` where i, j, and k, are positive integers, E are channels in the set of channels, P are demographic parameters in the set of demographic parameters $\{P_1, \ldots P_M\}$, N is a positive integer representing a number of channels E in the set of channels, M is a positive integer representing a number of demographic parameters P in the set of demographic parameters $\{P_1, \ldots P_M\}$, D is a value from 0 to 1 representing a normalized value of P for the at least one user, T is a number from 0 to 1 representing a normalized target value of a demographic parameter $P_k$ at which an element $E_i$ is higher in the list than element $E_j$, W is a weight associated with T, VP is an absolute value of a delta between D and T, NVP is a value from 0 to 1 representing a normalized value of VP, S is a weighted score for a channel E, A is the sum of S for all channels in the set of channels.

2. The system of claim 1, wherein the set sorting component comprises an element scoring component configured to employ the element scoring algorithm to generate respective scores S for channels in the set of channels.

3. The system of claim 2, wherein the respective scores S indicate a probability that an associated channel will be selected for subscription by the at least one user.

4. The system of claim 2, wherein the sorting algorithm further comprises a list generation algorithm configured to define the order of the list to increase a likelihood that at least one channel of the subset of channels will be selected for subscription based upon the respective scores S and the set sorting component employs the list generation algorithm to generate the list.

5. The system of claim 1, further comprising a set presentation component configured to present the list to the at least one user and receive user input indicative of subscription of at least one channel from the list.

6. The system of claim 1, wherein the set sorting component further comprises a target value component configured to generate respective target values T for the at least one demographic parameter $\{P_1, \ldots P_M\}$ for pairs of channels of the set of channels $\{E_1 \ldots E_N\}$.

7. The system of claim 6, wherein the set sorting component employs a combing algorithm to reorder the list for a predefined subset size using the respective target values T.

8. A method, comprising:
receiving, by a device including a microprocessor, at least one demographic parameter $\{P_1, \ldots P_M\}$ associated with at least one user;
receiving, by the device, a set of channels $\{E_1, \ldots E_N\}$; and
generating, by the device using an element sorting algorithm, a list comprising a subset of the channels in an order defined to increase a likelihood that at least one channel of the subset of channels will be selected for subscription, wherein the sorting algorithm comprises an element scoring algorithm comprising:

```
        i = 1,
        A = 0,
        while i ≤ N,
            S_i = 0,
                j = 1,
                while j ≤ N,
                    k = 1,
                    while k ≤ M,
                        obtain vector (E_i, E_j, P_k, T_ijk, W_ijk),
                        obtain D_k,
                        VP_ijk = |D_k - T_ijk|,
                        NVP_ijk = (1 / (1 + VP_ijk)) - 1,
                        S_i = S_i + (NVP_ijk * W_ijk),
                        k = k + 1,
                    j = j + 1,
            A = A + S_i,
            i = i + 1,
``` where i, j, and k, are positive integers, E are channels in the set of channels, P are demographic parameters in the set of demographic parameters $\{P_1, \ldots P_M\}$, N is a positive integer representing a number of channels E in the set of channels, M is a positive integer representing a number of demographic parameters P in the set of demographic parameters $\{P_1, \ldots P_M\}$, D is a value from 0 to 1 representing a normalized value of P for the at least one user, T is a number from 0 to 1 representing a normalized target value of a demographic parameter $P_k$ at which an element $E_i$ is higher in the list than element $E_j$, W is a weight associated with T, VP is an absolute value of a delta between D and T, NVP is a value from 0 to 1 representing a normalized value of VP, S is a weighted score for a channel E, A is the sum of S for all channels in the set of channels.

9. The method of claim 8, wherein the respective scores S indicate a probability that an associated channel will be selected for subscription by the at least one user.

10. The method of claim 9, further comprising generating the respective scores S based upon the at least one demographic parameter $\{P_1, \ldots P_M\}$.

11. The method of claim 9, further comprising generating the list based upon the respective scores S.

12. The method of claim 8, further comprising presenting the list to the at least one user and receiving user input indicative of subscription of at least one channel from the list.

13. The method of claim 8, further comprising generating respective target values T for the at least one demographic parameter $\{P_1, \ldots P_M\}$ for pairs of channels of the set of channels $\{E_1, \ldots E_N\}$.

14. The method of claim 13, further comprising reordering the list for a predefined subset size using the respective target values T.

15. A non-transitory computer-readable medium having instructions stored thereon that, in response to execution, cause at least one device including a processor to perform operations comprising:
    retrieving at least one demographic parameter $\{P_1, \ldots P_M\}$ associated with at least one user;
    retrieving a set of elements $\{E_1, \ldots E_N\}$; and
    generating, using an element sorting algorithm, a list comprising a subset of the elements in an order defined to increase a likelihood that at least one element of the subset of elements will be selected for subscription, wherein the sorting algorithm comprises an element scoring algorithm comprising:

```
        i = 1,
        A = 0,
        while i ≤ N,
            S_i = 0,
                j = 1,
                while j ≤ N,
                    k = 1,
                    while k ≤ M,
                        obtain vector (E_i, E_j, P_k, T_ijk, W_ijk),
                        obtain D_k,
                        VP_ijk = |D_k - T_ijk|,
                        NVP_ijk = (1 / (1 + VP_ijk)) - 1,
                        S_i = S_i + (NVP_ijk * W_ijk),
                        k = k + 1,
                    j = j + 1,
            A = A + S_i,
            i = i + 1,
``` where i, j, and k, are positive integers, E are channels in the set of channels, P are demographic parameters in the set of demographic parameters $\{P_1, \ldots P_M\}$, N is a positive integer representing a number of channels E in the set of channels, M is a positive integer representing a number of demographic parameters P in the set of demographic parameters $\{P_1, \ldots P_M\}$, D is a value from 0 to 1 representing a normalized value of P for the at least one user, T is a number from 0 to 1 representing a normalized target value of a demographic parameter $P_k$ at which an element $E_i$ is higher in the list than element $E_j$, W is a weight associated with T, VP is an absolute value of a delta between D and T, NVP is a value from 0 to 1 representing a normalized value of VP, S is a weighted score for a channel E, A is the sum of S for all channels in the set of channels.

16. The non-transitory computer-readable medium of claim 15, wherein the respective scores S indicate a probability that an associated element will be selected for subscription by the at least one user.

17. The non-transitory computer-readable medium of claim 16, the operations further comprising generating the respective scores S based upon the at least one demographic parameter $\{P_1, \ldots P_M\}$.

18. The non-transitory computer-readable medium of claim 16, the operations further comprising generating the list based upon the respective score S.

19. The non-transitory computer-readable medium of claim 15, the operations further comprising presenting the list to the at least one user and receiving user input indicative of subscription of at least one element from the list.

20. The non-transitory computer-readable medium of claim 15, the operations further comprising generating respective target values T for the at least one demographic parameter $\{P_1, \ldots P_M\}$ for pairs of elements of the set of elements $\{E_1, \ldots E_N\}$.

21. The non-transitory computer-readable medium of claim 20, the operations further comprising reordering the list for a predefined subset size using the respective target values T.

* * * * *